United States Patent
Nagata et al.

(10) Patent No.: US 12,449,578 B2
(45) Date of Patent: Oct. 21, 2025

(54) OPTICAL FILTER

(71) Applicant: AGC INC., Tokyo (JP)

(72) Inventors: Takashi Nagata, Shizuoka (JP); Takahiro Sakagami, Shizuoka (JP); Kazuhiko Shiono, Fukushima (JP)

(73) Assignee: AGC INC., Tokyo (JP)

( * ) Notice: Subject to any disclaimer, the term of this patent is extended or adjusted under 35 U.S.C. 154(b) by 0 days.

(21) Appl. No.: 19/002,256

(22) Filed: Dec. 26, 2024

(65) Prior Publication Data

US 2025/0123431 A1    Apr. 17, 2025

Related U.S. Application Data

(63) Continuation of application No. PCT/JP2023/045813, filed on Dec. 20, 2023.

(30) Foreign Application Priority Data

Dec. 27, 2022 (JP) ................... 2022-210260

(51) Int. Cl.
G02B 5/20 (2006.01)
(52) U.S. Cl.
CPC .................... *G02B 5/208* (2013.01)
(58) Field of Classification Search
CPC . G02B 5/208; G02B 5/20; G02B 5/22; G02B 5/223; G02B 5/26; C09B 67/0063; C09B 23/166
See application file for complete search history.

(56) References Cited

U.S. PATENT DOCUMENTS

| | | |
|---|---|---|
| 2013/0207057 A1 | 8/2013 | Ikenishi et al. |
| 2020/0040161 A1 | 2/2020 | Kubo et al. |
| 2020/0354577 A1 | 11/2020 | Suzuki et al. |
| 2020/0379150 A1 | 12/2020 | Takagi et al. |
| 2024/0287312 A1 | 8/2024 | Suzuki et al. |
| 2024/0427068 A1* | 12/2024 | Shiono .................. G02B 5/226 |
| 2025/0044490 A1* | 2/2025 | Nakayama ............ G02B 5/223 |

FOREIGN PATENT DOCUMENTS

| | | |
|---|---|---|
| JP | 2015-221751 | 12/2015 |
| JP | 6802938 | 12/2020 |
| JP | 2021-015269 | 2/2021 |
| JP | 7586387 | 11/2024 |

(Continued)

OTHER PUBLICATIONS

International Search Report issued on Mar. 19, 2024, in PCT/JP2023/045813 filed on Dec. 20, 2023.

(Continued)

*Primary Examiner* — Stephone B Allen
*Assistant Examiner* — Adam W Booher
(74) *Attorney, Agent, or Firm* — Oblon, McClelland, Maier &Neustadt, L.L.P.

(57) ABSTRACT

An optical filter includes: a dielectric multilayer film 1; a substrate comprising a near-infrared ray absorbing glass and a resin film; and a dielectric multilayer film 2 in this order. The resin film comprises a near-infrared ray absorbing dye and a resin, the near-infrared ray absorbing glass is a fluorophosphate glass containing P, Cu, and F, and the optical filter satisfies all of the spectral characteristics (i-1) to (i-3), (i-5), and (i-13).

12 Claims, 5 Drawing Sheets

(56) References Cited

FOREIGN PATENT DOCUMENTS

| WO | WO 2019/111965 | 6/2019 |
| WO | WO 2019-151348 | 8/2019 |
| WO | WO2019/168090 | 9/2019 |
| WO | WO 2019/189039 | 10/2019 |

OTHER PUBLICATIONS

Written Opinion of the International Search Authority issued on Mar. 19, 2024, in PCT/JP2023/045813 filed on Dec. 20, 2023.
Decision to grant of JP 2024-552073, dated Oct. 8, 2024 with English machine translation.

* cited by examiner

OPTICAL FILTER

CROSS-REFERENCE TO RELATED APPLICATIONS

This is a bypass continuation of International Application No. PCT/JP2023/045813 filed on Dec. 20, 2023, and claims priority from Japanese Patent Application No. 2022-210260 filed on Dec. 27, 2022, the entire content of which is incorporated herein by reference.

TECHNICAL FIELD

The present invention relates to an optical filter that transmits visible light and shields near-infrared light.

BACKGROUND ART

In an imaging device including a solid state image sensor, in order to satisfactorily reproduce a color tone and obtain a clear image, an optical filter that transmits light in a visible region (hereinafter, also referred to as "visible light") and shields light in a near-infrared wavelength region (hereinafter, also referred to as "near-infrared light") is used.

Examples of such an optical filter include various types such as a reflection type filter in which dielectric thin films having different refractive indices are alternately laminated on one surface or both surfaces of a transparent substrate (dielectric multilayer film) and light to be shielded is reflected by utilizing interference of light, an absorption type filter in which light to be shielded is absorbed by using a glass or a dye that absorbs light in a specific wavelength region, and a filter in which a reflection type filter and an absorption type filter are combined.

Patent Literature 1 discloses an optical filter containing a copper complex that absorbs light in a near-infrared ray region.

Patent Literature 2 discloses an optical filter containing a dye that absorbs light in a near-infrared ray region.

Patent Literature 3 discloses an optical filter including a glass that absorbs light in a near-infrared ray region and a reflection layer formed of a dielectric multilayer film.

CITATION LIST

Patent Literature

Patent Literature 1: JP6802938B
Patent Literature 2: WO2019/168090
Patent Literature 3: WO2019/151348

SUMMARY OF INVENTION

Technical Problem

The optical filter disclosed in Patent Literature 1 is formed by coating a copper complex that absorbs light onto a phosphate glass, and has poor moisture resistance and room for improvement in terms of weather resistance.

The optical filter disclosed in Patent Literature 2 has room for improvement in that the optical filter blocks light in a wide range in a near-infrared region solely by absorption characteristics of a dye, resulting in a decrease in transmittance in a visible light region.

In an optical filter utilizing reflection of a dielectric multilayer film such as the optical filter disclosed in Patent Literature 3, an optical thickness of the dielectric multilayer film changes depending on an incident angle of light, and thus there is a concern that a spectral transmittance curve and a spectral reflectance curve change depending on the incident angle. For example, when uptake of light in a visible light region changes at a high incident angle, a problem that image reproducibility is reduced may occur. In particular, with a reduction in height of camera modules in recent years, use under a condition of a high incident angle is assumed, and therefore an optical filter that is hardly affected by an incident angle is required.

An object of the present invention is to provide an optical filter which has excellent weather resistance, excellent transmissivity in a visible light region, and excellent shielding properties in a near-infrared light region, particularly in a wide range including around 1200 nm, and a change in spectral characteristics is small even at a high incident angle.

Solution to Problem

The present invention provides an optical filter having the following configuration.

[1] An optical filter including:
a dielectric multilayer film 1;
a substrate including a near-infrared ray absorbing glass and a resin film; and
a dielectric multilayer film 2 in this order, in which
the resin film contains a near-infrared ray absorbing dye and a resin,
the near-infrared ray absorbing glass is a fluorophosphate glass containing P, Cu, and F, and
the optical filter satisfies all of the following spectral characteristics (i-1) to (i-5):
(i-1) an absolute value of a difference between an average transmittance $T_{440\text{-}600(0deg)AVE}$ at a wavelength of 440 nm to 600 nm and an incident angle of 0 degrees and an average transmittance $T_{440\text{-}600(60deg)AVE}$ at a wavelength of 440 nm to 600 nm and an incident angle of 60 degrees is 15% or less.
(i-2) the average transmittance $T_{440\text{-}600(0deg)AVE}$ is 75% or more
(i-3) a wavelength $IR\_T_{50(0deg)}$ at which a transmittance is 50% at an incident angle of 0 degrees is in a wavelength range of 580 nm to 640 nm
(i-4) an average transmittance $T_{700\text{-}800(0deg)AVE}$ at a wavelength of 700 nm to 800 nm and an incident angle of 0 degrees is 1.1% or less.
(i-5) an average transmittance $T_{800\text{-}1200(0deg)AVE}$ at a wavelength of 800 nm to 1200 nm and an incident angle of 0 degrees is 5% or less.

Advantageous Effects of Invention

According to the present invention, an optical filter which has excellent weather resistance, excellent transmissivity in a visible light region, and excellent shielding properties in a near-infrared light region, particularly in a wide range including around 1200 nm, and a change in spectral characteristics is small even at a high incident angle can be provided.

DESCRIPTION OF EMBODIMENTS

Figure 1:
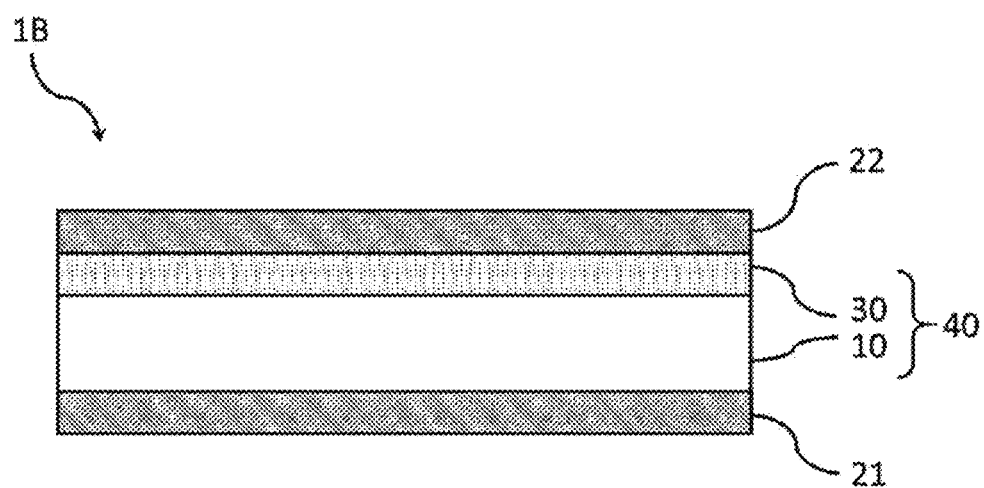
FIG. 1 is a cross-sectional view schematically illustrating an example of an optical filter according to one embodiment.

Hereinafter, embodiments of the present invention are described.

In the present description, a near-infrared ray absorbing dye may be abbreviated as an "NIR dye", and an ultraviolet absorbing dye may be abbreviated as a "UV dye".

In the present description, a compound represented by a formula (I) is referred to as a compound (I). The same applies to compounds represented by other formulae. A dye composed of the compound (I) is also referred to as a dye (I), and the same applies to other dyes. A group represented by the formula (I) is also referred to as a group (I), and the same applies to groups represented by other formulae.

In the present description, an internal transmittance is a transmittance obtained by subtracting an influence of interface reflection from a measured transmittance, which is represented by a formula of {measured transmittance (incident angle of 0 degrees)/(100−reflectance (incident angle of 5 degrees)}×100.

In the present description, a transmittance of, for example, 90% or more in a specific wavelength region means that the transmittance does not fall below 90% in the entire wavelength region, that is, a minimum transmittance is 90% or more in the wavelength region. Similarly, a transmittance of, for example, 1% or less in a specific wavelength region means that the transmittance does not exceed 1% in the entire wavelength region, that is, a maximum transmittance is 1% or less in the wavelength region. The same applies to the internal transmittance. An average transmittance and an average internal transmittance in a specific wavelength region are an arithmetic mean of a transmittance and an internal transmittance per 1 nm in the wavelength region. A reflectance when a dielectric multilayer film side is set as an incident direction refers to an optical characteristic of light reflected when measurement light is incident on a surface of a dielectric multilayer film provided on in an optical filter. Spectral characteristics can be measured by using an ultraviolet-visible spectrophotometer.

In the present description, the symbol "-" or the word "to" that is used to express a numerical range includes the numerical values before and after the symbol or the word as the upper limit and the lower limit of the range, respectively.

<Optical Filter>

An optical filter according to the present embodiment includes a dielectric multilayer film 1, a substrate including a near-infrared ray absorbing glass and a resin film, and a dielectric multilayer film 2 in this order. The resin film contains a near-infrared ray absorbing dye and a resin, and the near-infrared ray absorbing glass is a fluorophosphate glass containing P, Cu, and F.

In the present invention, as described later, a light shielding property of the optical filter is preferably ensured by absorption characteristics of the near-infrared ray absorbing glass and the near-infrared ray absorbing dye, and reflection characteristics of the dielectric multilayer films. Since an influence of an incident angle of light on the absorption characteristics is relatively minor, an optical filter in which a change in spectral characteristics is small even at a high incident angle is obtained.

A configuration example of the optical filter according to the present embodiment is described with reference to the drawings. FIG. 1 is a cross-sectional view schematically illustrating an example of an optical filter according to one embodiment.

An optical filter 1B illustrated in FIG. 1 is an example including a dielectric multilayer film 21, a substrate 40 including a near-infrared ray absorbing glass 10 and a resin film 30, and a dielectric multilayer film 22.

The optical filter according to the present embodiment satisfies all of the following spectral characteristics (i-1) to (i-5):

(i-1) an absolute value of a difference between an average transmittance $T_{440\text{-}600(0deg)AVE}$ at a wavelength of 440 nm to 600 nm and an incident angle of 0 degrees and an average transmittance $T_{440\text{-}600(60deg)AVE}$ at a wavelength of 440 nm to 600 nm and an incident angle of 60 degrees is 15% or less (i-2) the average transmittance $T_{440\text{-}600(0deg)AVE}$ is 75% or more (i-3) a wavelength $IR\_T_{50(0deg)}$ at which a transmittance is 50% at an incident angle of 0 degrees is in a wavelength range of 580 nm to 640 nm (i-4) an average transmittance $T_{700\text{-}800(0deg)AVE}$ at a wavelength of 700 nm to 800 nm and an incident angle of 0 degrees is 1.1% or less (i-5) an average transmittance $T_{800\text{-}1200(0deg)AVE}$ at a wavelength of 800 nm to 1200 nm and an incident angle of 0 degrees is 5% or less.

The optical filter according to the present embodiment, which satisfies all of the spectral characteristics (i-1) to (i-5), has high transmissivity of visible light as shown in the characteristic (i-2), and high near-infrared light shielding properties in a wide range of 800 nm to 1200 nm as shown in the characteristics (i-4) and (i-5). As shown in the characteristic (i-3), there is a wavelength at which a transmittance is 50% at an incident angle of 0 degrees within a specific wavelength range, and as shown in the characteristic (i-1), a change in spectral characteristic of visible light is small even at a high incident angle.

Satisfying the spectral characteristics (i-1) and (i-2) means that visible light transmissivity is excellent with no decrease in visible light transmittance even at a high incident angle.

The absolute value of the difference in the spectral characteristic (i-1) is preferably 15% or less, and more preferably 10% or less.

The average transmittance $T_{440-600(0deg)AVE}$ is preferably 76% or more, and more preferably 77% or more.

The spectral characteristics (i-1) and (i-2) can be achieved, for example, by using a dielectric multilayer film having a low reflectance in a visible light region and by using a near-infrared ray absorbing dye having a high transmittance in the visible light region and a fluorophosphate glass as the near-infrared ray absorbing glass.

Satisfying the spectral characteristic (i-3) means that light in a near-infrared light region can be blocked and visible transmitted light can be efficiently taken in.

The wavelength $IR\_T_{50(0deg)}$ is preferably in a range of 580 nm to 630 nm, and more preferably in a range of 590 nm to 625 nm.

The spectral characteristic (i-3) can be achieved, for example, by using a fluorophosphate glass, which is described later, as the near-infrared ray absorbing glass.

Satisfying the spectral characteristic (i-4) means that the near-infrared light shielding property is excellent.

The average transmittance $T_{700-800(0deg)AVE}$ is preferably 0.6% or less, more preferably 0.3% or less, and particularly preferably 0.1% or less.

The spectral characteristic (i-4) can be achieved, for example, by using a squarylium dye, which is described later, as the near-infrared ray absorbing dye, and a fluorophosphate glass, which is described later, as the near-infrared ray absorbing glass.

Satisfying the spectral characteristic (i-5) means that a light shielding property in the near-infrared light region up to a wide range around 1200 nm is excellent.

The average transmittance $T_{800-1200(0deg)AVE}$ is preferably 4% or less, and more preferably 3% or less.

The spectral characteristic (i-5) can be achieved, for example, by using a fluorophosphate glass, which is described later, as the near-infrared ray absorbing glass.

The optical filter according to the present embodiment preferably satisfies all of the following spectral characteristics (i-6) and (i-7):
- (i-6) when a dielectric multilayer film 1 side is set as an incident direction, an average reflectance $R1_{440-650(5deg)AVE}$ at a wavelength of 440 nm to 650 nm and an incident angle of 5 degrees is 1.5% or less
- (i-7) when a dielectric multilayer film 1 side is set as an incident direction, an average reflectance $R1_{850-1200(5deg)AVE}$ at a wavelength of 850 nm to 1200 nm and an incident angle of 5 degrees is 60% or more.

The spectral characteristics (i-6) and (i-7) substantially reflect reflection characteristics of the dielectric multilayer film 1, which means that the dielectric multilayer film 1 has small visible light reflection characteristics and has reflection characteristics in the near-infrared light region.

The average reflectance $R1_{440-650(5deg)AVE}$ is more preferably 1.3% or less, still more preferably 1.2% or less, and particularly preferably 1.1% or less.

The average reflectance $R1_{850-1200(5deg)AVE}$ is more preferably 63% or more, still more preferably 65% or more, and particularly preferably 70% or more. When the reflection characteristics in the near-infrared light region are too strong, the change in visible light transmittance is likely to occur at a high incident angle, so that the average reflectance $R1_{850-1200(5deg)AVE}$ is preferably 95% or less, and more preferably 90% or less.

The optical filter according to the present embodiment preferably satisfies the following spectral characteristic (i-8):
- (i-8) when a dielectric multilayer film 1 side is set as an incident direction, an average reflectance $R1_{440-650(60deg)AVE}$ at a wavelength of 440 nm to 650 nm and an incident angle of 60 degrees is 10% or less.

The spectral characteristic (i-8) substantially reflects the reflection characteristic of the dielectric multilayer film 1, which means that the dielectric multilayer film 1 has a small visible light reflection characteristic even at a high incident angle.

The average reflectance $R1_{440-650(60deg)AVE}$ is more preferably 9% or less, and still more preferably 8.5% or less.

The optical filter according to the present embodiment preferably satisfies all of the following spectral characteristics (i-9) and (i-10):
- (i-9) when a dielectric multilayer film 2 side is set as an incident direction, an average reflectance $R2_{440-650(5deg)AVE}$ at a wavelength of 440 nm to 650 nm and an incident angle of 5 degrees is less than 2.0%
- (i-10) when a dielectric multilayer film 2 side is set as an incident direction, an average reflectance $R2_{700-850(5deg)AVE}$ at a wavelength of 700 nm to 850 nm and an incident angle of 5 degrees is 1.2% or less.

The spectral characteristics (i-9) and (i-10) substantially reflect reflection characteristics of the dielectric multilayer film 2, which mean that the dielectric multilayer film 2 is an anti-reflection film having small reflection characteristics in both the visible light region and the near-infrared light region.

The average reflectance $R2_{440-650(5deg)AVE}$ is more preferably 1.70% or less, and still more preferably 1.53% or less.

The average reflectance $R2_{700-85(5deg)AVE}$ is more preferably 1.1% or less, still more preferably 1.0% or less, and particularly preferably 0.8% or less.

The optical filter according to the present embodiment preferably satisfies all of the following spectral characteristics (i-11) and (i-12):
- (i-11) when a dielectric multilayer film 2 side is set as an incident direction, an average reflectance $R2_{440-650(60deg)AVE}$ at a wavelength of 440 nm to 650 nm and an incident angle of 60 degrees is less than 10%
- (i-12) when a dielectric multilayer film 2 side is set as an incident direction, an average reflectance $R2_{700-550(60deg)AVE}$ at a wavelength of 700 nm to 850 nm and an incident angle of 60 degrees is 8% or less.

The spectral characteristics (i-11) and (i-12) substantially reflect the reflection characteristics of the dielectric multilayer film 2, which mean that the dielectric multilayer film. 2 is an anti-reflection film having small reflection characteristics in both the visible light region and the near-infrared light region even at a high incident angle.

The average reflectance $R2_{440-600(60deg)AVE}$ is more preferably 9% or less, and still more preferably 8.5% or less.

The average reflectance $R2_{700-850(60deg)AVE}$ is more preferably 7.5% or less, still more preferably 7.0% or less, and particularly preferably 6% or less.

The optical filter according to the present invention preferably satisfies the following spectral characteristic (i-13):
- (i-13) when a dielectric multilayer film 1 side is set as an incident direction, an absolute value of a difference between a wavelength $IR\_R_{50(5deg)}$ at which a reflectance is 50% at an incident angle of 5 degrees in a wavelength range of 750 nm to 900 nm and a wavelength $IR\_R_{50(5deg)}$ at which a transmittance is 50% at an incident angle of 5 degrees in a wavelength range of 500 nm to 700 nm is 160 nm or more.

Satisfying the spectral characteristic (i-13) means that a light-shielding region of the reflection characteristic is separated from a light-shielding region of the absorption characteristic.

The absolute value of the difference in the spectral characteristic (i-13) is more preferably 165 nm or more, still more preferably 170 nm or more, and particularly preferably 185 nm or more.

The optical filter according to the present embodiment preferably satisfies all of the following spectral characteristics (i-14) and (i-15):

(i-14) an average value of absorption loss amount$_{700-800}$ at a wavelength of 700 nm to 800 nm is 25% or more (i-15) an average value of absorption loss amount$_{850-1000}$ at a wavelength of 850 nm to 1000 nm is 17% or more where, when a dielectric multilayer film 1 side is set as an incident direction, an absorption loss amount$_{X-Y}$ at a wavelength of X nm to Y nm is defined as follows:

(Absorption loss amount$_{X-Y}$) [%]=100−(transmittance at an incident angle of 5 degrees)−(reflectance at an incident angle of 5 degrees).

A larger absorption loss amount indicates that more light in that wavelength range is absorbed.

Satisfying the spectral characteristics (i-14) and (i-15) means that a proportion of the spectral characteristics formed by absorption loss is equal to or greater than a certain level. The larger this proportion is, the less variation in spectral characteristics can be expected between vertical incident light and obliquely incident light.

The average value of (absorption loss amount)$_{700-800}$ is more preferably 26.5% or more, and still more preferably 28% of more.

The average value of (absorption loss amount)$_{850-1000}$ is more preferably 18% or more, and still more preferably 20% or more.

The spectral characteristics (i-14) and (i-15) can be achieved, for example, by using a near infrared ray absorbing dye having a maximum absorption wavelength at a wavelength of 700 nm to 800 am <Near-Infrared Ray Absorbing Glass (Fluorophosphate Glass)>

The near-infrared ray absorbing glass in the optical filter according to the present embodiment is a fluorophosphate glass containing P. Cu, and F (hereinafter, also referred to as the fluorophosphate glass of the present embodiment, or simply as fluorophosphate glass or glass).

By incorporating Cu into a fluorophosphate glass containing P and F, a high transmittance of light in a visible region can be maintained while keeping a transmittance of light in a near-infrared region low. By incorporating F in the glass, weather resistance such as moisture resistance can be improved.

Each component that can constitute the fluorophosphate glass of the present embodiment and a suitable content thereof is described below. In the present description, unless otherwise specified, the content of each component and the total content are expressed in terms of mass %. A transmittance of the glass in the present embodiment is intended to include a reflection characteristic of a glass surface (that is, not an internal transmittance of the glass).

In the fluorophosphate glass of the present embodiment, P is contained as $P^{5+}$.

$P^{5+}$ is a main component that forms the fluorophosphate glass, and is an essential component for improving a near-infrared ray cutting property. When the content of $P^{5+}$ is 30% or more, the effect thereof can be sufficiently obtained, and when the content of $P^{5+}$ is 70% or less, problems such as glass instability and deterioration in weather resistance are unlikely to occur. Therefore, the content of $P^{5+}$ is preferably 30% to 70%. The content of $P^{5+}$ is more preferably 31% or more, still more preferably 32% or more, and even more preferably 33% or more, and is more preferably 60% or less, still more preferably 50% or less, even more preferably 45% or less, and most preferably 43% or less.

As a raw material for $P^{5+}$, from the viewpoint of preventing corrosion of a platinum crucible and preventing volatilization of the components, it is preferable to use phosphoric acid or a salt thereof.

In the fluorophosphate glass of the present embodiment, F is contained as $F^-$.

$F^-$ is an essential component for stabilizing the glass and improving the weather resistance. In the present description, the content of $F^-$ in the glass is expressed by an external ratio when component elements other than $F^-$ contained in the glass are taken as 100 mass %. The content of $F^-$ is preferably 5% to 70% by external ratio. When the content of $F^-$ is 5% or more by external the weather resistance effect is sufficient, and when the content of $F^-$ is 70% or less by external ratio, problems such as a decrease in transmittance of light in the visible region, a decrease in mechanical properties such as strength, hardness, and elastic modulus, and an increase in ultraviolet ray transmittance are unlikely to occur. The content of $F^-$ is more preferably 6% or more by external ratio, still more preferably 8% or more by external ratio, even more preferably 8.5% or more by external ratio, and most preferably 10% or more by external ratio, and is more preferably 60% or less by external ratio, still more preferably 50% or less by external ratio, even more preferably 40% or less by external ratio, and most preferably 25% or less by external ratio.

In the fluorophosphate glass of the present embodiment, Cu is contained as $Cu^+$ or $Cu^{2+}$, but in the present description, all the contents are described when present as $Cu^{2+}$.

$Cu^{2+}$ is an essential component for cutting near-infrared rays. The content of $Cu^{2+}$ is preferably 1% to 20%. When the content of $Cu^{2+}$ is 1% or more, the effect thereof and the effect of increasing the transmittance of light in the visible region of the glass obtained when co-added with Mo can be sufficiently obtained, and when the content of $Cu^{2+}$ is 20% or less, problems such as generation of devitrification impurities in the glass and a decrease in transmittance of light in the visible region are unlikely to occur. The content of $Cu^{2+}$ is more preferably 4.5% of more, still more preferably 6% or more, even more preferably 7.5% or more, and most preferably 7.8% or more, and is more preferably 18% or less, still more preferably 16% or less, even more preferably 13% or less, and most preferably 12% or less.

The total Cu content is a total content of Cu expressed by mass %, including monovalent, divalent, and other existing valences. When the glass of the present embodiment (excluding the content of $F^-$) is taken as 100 mass %, the total Cu content in the glass is preferably in a range of 1 mass % to 20 mass %. When the total Cu content is 1 mass % or more, the effect of cutting near-infrared rays can be sufficiently obtained even when a plate thickness of the glass is small, and when the total Cu content is 20 mass % or less, a decrease in visible region transmittance can be prevented. The total Cu content is more preferably 4.5% or more, still more preferably 6% or more, even more preferably 7.5% or more, and most preferably 9% or more, and is more preferably 18% or less, still more preferably 16% or less, even more preferably 13% or less, and most preferably 11.5% or less. The content of $Cu^+$ expressed by mass % can be determined such that ($Cu^+$/total Cu content)×100 [%] is in a range of 0.01% to 4.0%.

$Al^{3+}$ is a main component forming the glass, and is a component for enhancing strength of the glass, enhancing the weather resistance of the glass, and the like. In the case where the glass contains $Al^{3+}$, when the content of $Al^{3+}$ is 2% or more, the effect thereof can be sufficiently obtained, and when the content of $Al^{3+}$ is 20% or less, problems such as glass instability and deterioration in near-infrared ray cutting property are unlikely to occur. The content of $Al^{3+}$ is preferably 0% to 20%. The content of $Al^{3+}$ is more preferably 2% or more, still more preferably 3% or more, even more preferably 3.5% or more, and most preferably 5% or more, and is more preferably 18% or less, still more preferably 15% or less, even more preferably 13% or less, and most preferably 10% or less.

As a raw material for $Al^{3+}$, $AlF_3$, $Al_2O_3$, $Al(OH)_3$, and the like can be used. Among them, it is preferable to use $AlF_3$, since problems such as an increase in melting temperature, generation of unmelted matter, and glass instability due to a decrease in charged amount of $F^-$ are unlikely to occur.

$Li^+$ is a component for lowering the melting temperature of the glass, lowering the liquid phase temperature of the glass, stabilizing the glass, and the like. The content of $Li^+$ is preferably 0% to 20%. When the content of $Li^+$ is 20% or less, problem is such as glass instability and deterioration in near-infrared cutting property are unlikely to occur. The content of $Li^+$ is more preferably 18% or less, still more preferably 15% or less, even more preferably 12% or less, and most preferably 10% or less.

In the fluorophosphate glass of the present embodiment, Na can be contained as $Na^+$.

$Na^+$ is a component for lowering the melting temperature of the glass, lowering the liquid phase temperature of the glass, stabilizing the glass, and the like. When the glass contains $Na^+$, the effect of increasing the transmittance of light in the visible region of the glass obtained when co-added with Mo can be sufficiently obtained. A mechanism thereof can be explained as follows. Oxygen ions are present around $Cu^+$ in the fluorophosphate glass, and these oxygen ions are negatively charged. An electric field generated by the negative charges acts to inhibit movement of electrons ($e^-$) between the $Cu^+$ and $Mo^{6+}$ ($Cn^+ \rightarrow Cu^{2+}+e^-$) and ($Mo^{6+}+e^- \rightarrow Mo^{5+}$). Due to the presence of $Na^+$ in the fluorophosphate glass, the negative charges of the oxygen ions are electrically neutralized by positive charges carried by $Na^+$. As a result, movement of electrons between the $Cu^+$ and $Mo^{5+}$ is promoted, the proportion of $Cu^+$ having light absorption characteristics in the visible region is reduced, and the light transmittance in the visible region is increased.

When the glass contains $Na^+$, the content of $Na^+$ is preferably 0.1% to 25%. When the content of $Na^+$ is 25% or less, the glass is less likely to become unstable. The content of $Na^+$ is more preferably 0.5% or more, 1 more preferably 1% or more, even more preferably 2% or more, and most preferably 3% or more, and is more preferably 20% or less, still more preferably 18% or less, even more preferably 14% or less, and most preferably 10% or less.

$K^+$ is a component having effects such as lowering the melting temperature of the glass and lowering the liquid phase temperature of the glass. The content of $K^+$ is preferably 0% to 25%. It is preferable that the content of $K^+$ is 25% or less, since the glass is unlikely to become unstable. The content of $K^+$ is more preferably 23% or less, still more preferably 20% or less, even more preferably 18% or less, and most preferably 15% or less.

$R^+$ (one or more components selected from $Li^+$, $Na^+$, and $K^+$) is a component for lowering the melting temperature of the glass, lowering the liquid phase temperature of the glass, stabilizing the glass, and the like. The total content of $R^+$, that is, the total content ($\Sigma R^+$) of $Li^+$, $Na^+$, and $K^+$, is preferably 0.1% or more, since the effect thereof can be sufficiently obtained, and the total content ($\Sigma R^+$) is preferably 30% or less, since the glass is less likely to become unstable. Therefore, the content of $\Sigma R^+$ is preferably 0.1% to 30%. The content of $\Sigma R^+$ is more preferably 1% or more, still more preferably 3% or more, even more preferably 5% of more, and most preferably 8% or more, and is more preferably 28% or less, still more preferably 27% or less, even more preferably 26% or less, and most preferably 25% or less.

$Mg^{2+}$ is a component for lowering the melting temperature of the glass, lowering the liquid phase temperature of the glass, stabilizing the glass, increasing the glass strength, and the like. The content of $Mg^{2+}$ is preferably 0% to 10%. When the content of $Mg^{2+}$ is 10% or less, problems such as glass instability and deterioration in near infrared ray cutting property are unlikely to occur. The content of $Mg^{2+}$ is more preferably 8% or less, still more preferably 6% or less, even more preferably 5% or less, and most preferably 3% or less.

$Ca^{2+}$ is a component for lowering the melting temperature of the glass, lowering the liquid phase temperature of the glass, stabilizing the glass, increasing the glass strength, and the like. The content of $Ca^{2+}$ is preferably 0% to 20%. When the content of $Ca^{2+}$ is 20% or less, problems such as glass instability and deterioration in near-infrared ray cutting property are unlikely to occur. The content of $Ca^{2+}$ is more preferably 0.1% or more, still more preferably 1% or more, even more preferably 2% or more, and most preferably 3% or more, and is more preferably 18% or less, still more preferably 15% or less, even more preferably 10% or less, and most preferably 6% or less.

$Sr^{2+}$ is a component for lowering the melting temperature of the glass, lowering the liquid phase temperature of the glass, stabilizing the glass, and the like. The content of $Sr^{2+}$ is preferably 0% to 30%. When the content of $Sr^{2+}$ is 30% or less, problems such as glass instability and deterioration in near-infrared ray cutting property are unlikely to occur. The content of $Sr^{2+}$ is more preferably 0.1% or more, still more preferably 1% or more, even more preferably 3% or more, and most preferably 5% or more, and is more preferably 25% or less, still more preferably 20% or less, even more preferably 15% or less, and most preferably 10% or less.

$Ba^{2+}$ is a component for lowering the melting temperature of the glass, lowering the liquid phase temperature of the glass, stabilizing the glass, and the like. The content of $Ba^{2+}$ is preferably 0% to 40%. When the content of $Ba^{2+}$ is 40% or less, problems such as glass instability and deterioration in near-infrared ray cutting property are unlikely to occur. The content of $Ba^{2+}$ is more preferably 0.1% or more, still more preferably 5% or more, even more preferably 10% or more, and most preferably 15% or more, and is more preferably 35% or less, still more preferably 30% or less, even more preferably 25% or less, and most preferably 23% or less.

$R^{2+}$ (one or more components selected from $Mg^{2+}$, $Ca^{2+}$, $Sr^{2+}$, and $Ba^{2+}$) is a component for lowering the melting temperature of the glass, lowering the liquid phase temperature of the glass, stabilizing the glass, and the like. When the total content of $R^{2+}$, that is, the total content ($\Sigma R^{2+}$) of $Mg^{2+}$, $Ca^{2+}$, $Sr^{2+}$, and $Ba^{2+}$, is 10% or more, the effect thereof is sufficiently obtained, and when the content of $\Sigma R^{2+}$ is 45% or less, the glass is less likely to become unstable. Therefore, the content of $\Sigma R^{2+}$ is preferably 10% to 45%. The content of $\Sigma R^{2+}$ is more preferably 15% or more, still more preferably 20% or more, even more preferably 23% or more, and most preferably 25% or more, and is more preferably 40% or less, still more preferably 35% or less, even more preferably 33% or less, and most preferably 30% or less.

$Zn^{2+}$ has effects such as lowering the melting temperature of the glass and lowering the liquid phase temperature of the glass. The content of $Zn^{2+}$ is preferably 0% to 30%. When the content of $Zn^{2+}$ is 30% or less, problems such as glass instability, deterioration in solubility of the glass, and deterioration in near-infrared ray cutting property are unlikely to occur. The content of $Zn^{2+}$ is more preferably 20% or less, still more preferably 15% or less, even more preferably 10% or less, and most preferably 5% or less.

$Rb^+$ is a component having effects such as lowering the melting temperature of the glass and lowering the liquid phase temperature of the glass. The content of $Rb^+$ is preferably 0% to 10%. When the content of $Rb^+$ is 10% or less, the glass is less likely to become unstable. The content of $Rb^+$ is more preferably 8% or less, still more preferably 6% or less, even more preferably 4% or less, and most preferably 2% or less.

$Cs^+$ is a component having effects such as lowering the melting temperature of the glass and lowering the liquid phase temperature of the glass. The content of $Cs^+$ is preferably 0% to 10%. When the content of $Cs^+$ is 10% or less, the glass is unlikely to become unstable. The content of $Cs^+$ is more preferably 8% or less, still more preferably 6% or less, even more preferably 4% or less, and most preferably 2% or less.

$B^{3+}$ may be contained in a range of 20% or less in order to stabilize the glass. When the content of $B^{3+}$ is 20% or less, problems such as deterioration in the weather resistance of the glass and deterioration in near-infrared ray cutting property are unlikely to occur. The content of $B^{3+}$ is more preferably 15% or less, still more preferably 10% or less, even more preferably 8% or less, and most preferably 5% or less.

Mo is contained as $Mo^{5+}$ or $Mo^{6+}$, but in the present description, all the contents are described when present as $Mo^{6+}$.

$Mo^{6+}$ is a component for increasing the transmittance of light in the visible region of the glass.

Mo is known to exist in glass as $Mo^{2+}$ (hexavalent). However, when Mo and Cu are co-added in a phosphate glass, $Cu^+$ in the glass releases an electron (e) and becomes $Cu^{2+}$ ($Cu^+ \rightarrow Cu^{2+}+e^-$), and $Mo^{6+}$ receives the electron released by $Cu^+$ and becomes $Mo^{5+}$ (pentavalent) ($Mo^{6+}+e^- \rightarrow Mo^{5+}$). Accordingly, a proportion of $Cu^+$ (monovalent) that has an absorption characteristic in the vicinity of a wavelength of 300 nm to 600 nm decreases, and a transmittance of light having a wavelength of 400 nm to 540 nm increases. It is considered that since $Mo^{5+}$ is considered to have the property of absorbing light having a wavelength of about 400 nm, the transmittance of light having a wavelength of about 400 nm does not increase.

The content of $Mo^{6+}$ is preferably 0% to 4%. When Most is contained, the content thereof is preferably 0.01% to 4%. When the content of $Mo^{6+}$ is 0.01% or more, the effect of increasing the transmittance of light in the visible region of the glass can be sufficiently obtained, and when the content of $Mo^{6+}$ is 4% or less, problems such as deterioration in near-infrared ray cutting property and generation of devitrification impurities in the glass are unlikely to occur. The content of $Mo^{6+}$ is more preferably 0.05% or more, still more preferably 0.1% or more, even more preferably 0.2% or more, and most preferably 0.3% or more, and is more preferably 3.5% or less, still more preferably 3% or less, even more preferably 2% or less, and most preferably 1% or less.

When $Mo^{6+}$ is contained, a content ratio ($Mo^{6+}/Cu^{2+}$) of Most to $Cu^{2+}$ is preferably 0.01 to 0.39 on a mass basis. When the content ratio is 0.01 or more, absorption of light having a wavelength in a visible light range by $Cu^+$ can be sufficiently prevented, and absorption of light having a wavelength in the near-infrared region by $Cu^{2+}$ can be sufficiently promoted. When the content ratio is 0.39 or less, deterioration in transmittance in the visible range by $Mo^{5+}$ can be prevented. The content ratio is more preferably 0.02 or more, still more preferably 0.03 or more, even more preferably 0.05 or more, and most preferably 0.1 or more, and is more preferably 0.35 or less, still more preferably 0.3 or less, even more preferably 0.25 or less, and most preferably 0.2 or less.

In the fluorophosphate glass of the present embodiment, $SiO_2$, $GeO_2$, $ZrO_2$, $SnO_2$, $TiO_2$, $CeO_2$, $WO_3$, $Y_2O_3$, $La_2O_3$, $Gd_2O_3$, $Yb_2O_3$, and $Nb_2O_5$ may be contained in a range of 10% or less in order to improve the glass weather resistance. When the content of these components is 10% or less, problems such as generation of devitrification impurities in the glass and deterioration in near-infrared ray cutting property are unlikely to occur. The content of these components is preferably 4% or less, more preferably 3% or less, still more preferably 2% or less, and even more preferably 1% or less.

Any of $Fe_2O_3$, $Cr_2O_3$, $Bi_2O_3$, NiO, $V_2O_5$, $MnO_2$, and CoO is a component that reduces the transmittance of light in the visible region by being present in the glass. Therefore, it is preferable that these components are not substantially contained in the glass. Here, the expression "not substantially contained in the glass" means that the component is not contained except for unavoidable impurities, and means that the component is not actively added. Specifically, it means that the content of each of these components in the glass is about 100 ppm by mass or less.

In the fluorophosphate glass of the present embodiment, a coefficient of thermal expansion is preferably $60 \times 10^{-7}/°$ C. to $180 \times 10^{-7}/°$ C., more preferably $65 \times 10^{-7}/°$ C. to $175 \times 10^{-7}/°$ C., and still more preferably $70 \times 10^{-7}/°$ C. to $170 \times 10^{-7}/°$ C. in a range of 30° C. to 300° C.

The fluorophosphate glass in the optical filter according to the present embodiment preferably satisfies all of the following spectral characteristics (ii-1) to (ii-3):
(ii-1) a wavelength $IR\_T_{50(0deg)}$ at which a transmittance is 50% at an incident angle of 0 degrees is in a wavelength range of 590 nm to 640 nm
(ii-2) a transmittance $T_{700(0deg)}$ at a wavelength of 700 nm and an incident angle of 0 degrees is 25% or less
(ii-3) an average transmittance $T_{700-800(0deg)AVE}$ at a wavelength of 700 nm to 800 nm and an incident angle of 0 degrees is 10% or less.

As shown in the spectral characteristics (ii-1) to (ii-3), the near-infrared ray absorbing glass transmits visible light, a region of 590 nm to 640 nm is a boundary between a transmission band and an absorption band, and the absorption band begins at 700 nm or more. Accordingly, an optical filter having excellent transmissivity of visible light and excellent near-infrared light shielding properties can be obtained.

The wavelength $IR\_T_{50(0deg)}$ is in a range of more preferably 590 am to 630 nm, and still more preferably 590 nm to 624 nm.

The transmittance $T_{700(0deg)}$ is more preferably 20% or less, still more preferably 15% or less, and particularly preferably 10% or less.

The average transmittance $T_{700-800(0deg)AVE}$ is more preferably 9.8% or less, and still more preferably 9.7% or less.

The fluorophosphate glass in the optical filter according to the present embodiment preferably satisfies the following spectral characteristic (ii-4). Accordingly, an optical filter having excellent shielding properties for near-infrared light of 800 min or more can be obtained.

(ii-4) An average transmittance $T_{800-1200(0deg)AVE}$ at a wavelength of 800 nm to 1200 nm and an incident angle of 0 degrees is 10% or less The average transmittance $T_{800-1200(0deg)AVE}$ is more preferably 8% or less, and still more preferably 6% or less.

A thickness of the fluorophosphate glass in the optical filter according to the present embodiment is preferably 0.5 nm or less, and more preferably 0.4 nm or less. From the viewpoint of maintaining the strength of the element, the thickness is preferably 0.1 nm or more, and more preferably 0.15 nm or more.

<Dielectric Multilayer Film>

The optical filter according to the present embodiment includes the dielectric multilayer film 1 and the dielectric multilayer film 2. At least one of the dielectric multilayer films is preferably designed as a reflection film that reflects a part of near-infrared light (hereinafter, also referred to as an "NIR reflection film"). The other one of the dielectric multilayer films may be designed as a reflection film having a reflection region outside the near-infrared region, or as an anti-reflection film.

It is preferable that the NIR reflection film has, for example, a wavelength selectivity of transmitting visible light, transmitting near-infrared light in a transmission region of an absorption layer, and mainly reflecting other near-infrared light.

As shown in the spectral characteristic (i-5) and the spectral characteristic (i-7) of the optical filter, it is preferable that at least one of the dielectric multilayer films is a reflection film having a reflection characteristic in the near-infrared light region of a wavelength of 850 nm to 1200 nm, and light is blocked by such a characteristic.

By combining such a reflection characteristic of the specific wavelength region with the absorption characteristics of the near-infrared ray absorbing dye having a maximum absorption wavelength in the range of 740 nm to 800 nm and the fluorophosphate glass, which mainly absorbs light having a wavelength of 700 nm to 1200 nm, a wide range of near-infrared light having a wavelength of 700 m to 1200 nm can be blocked.

On the other hand, as shown in the spectral characteristic (i-6) and the spectral characteristic (i-8) of the optical filter, it is preferable that the dielectric multilayer film serving as the reflection film has a small change in reflection characteristics in the visible light region. Accordingly, an optical filter can be obtained in which the spectral characteristics in the visible light region are less likely to change depending on the incident angle and ripples are reduced.

In view of the above, it is preferable that at least one of the dielectric multilayer films is designed as a reflection film that does not reflect visible light but reflects near-infrared light (light having a wavelength of 800 nm to 1200 nm) at a light incident angle of 0 degrees and 60 degrees.

As shown in the spectral characteristic (i-9) to the spectral characteristic (i-12) of the optical filter, it is preferable that the other one of the dielectric multilayer films is designed as an anti-reflection layer having small reflection characteristics in both the visible light region and the near-infrared light region.

The dielectric multilayer film is composed of, for example, a dielectric multilayer film in which dielectric films having different refractive indices are laminated. More specifically, examples of the dielectric films include a dielectric film having a low refractive index (low refractive index film), a dielectric film having a medium refractive index (medium refractive index film), and a dielectric film having a high refractive index (high refractive index film), and the dielectric multilayer film is composed of a dielectric multilayer film in which two or more of those dielectric films are laminated.

A refractive index of the high refractive index film at a wavelength of 500 nm is preferably 1.6 or more, more preferably 1.8 to 2.5, and particularly preferably 2.2 to 2.5. Examples of a material of the high refractive index film include $Ta_2O_5$, $TiO_2$, TiO, and $Nb_2O_5$. Other commercially available products thereof include OS50 ($Ti_3O_5$), OS10 ($Ti_4O_7$), OA500 (a mixture of $Ta_2O_5$ and $ZrO_2$), and OA600 (a mixture of $Ta_2O_5$ and $TiO_2$) manufactured by Canon Optron, Inc. Among them, $TiO_2$ is preferred from the viewpoint of reproducibility in film formability and refractive index, stability, and the like.

A refractive index of the medium refractive index film at a wavelength of 500 nm is preferably 1.6 or more and less than 2.2. Examples of a material of the medium refractive index film include $ZrO_2$, $Nb_2O_5$, $Al_2O_3$, $HfO_2$, OM-4, OM-6 (mixtures of $Al_2O_3$ and $ZrO_2$), and OA-100 sold by Canon Optron, Inc., and H4 and M2 (alumina lanthania) sold by Merck KGaA. Among them, $Al_2O_3$-based compounds and mixtures of $Al_2O_3$ and $ZrO_2$ are preferred from the viewpoint of reproducibility in film formability and refractive index, stability, and the like.

A refractive index of the low refractive index film at a wavelength of 500 nm is preferably less than 1.6, and more preferably 1.38 to 1.5. Examples of a material of the low refractive index film include $SiO_2$, $SiO_xN_y$, and $MgF_2$. Other commercially available products thereof include S4F and S5F (mixtures of $SiO_2$ and $Al_2O_3$) manufactured by Canon Optron, Inc. Among them, $SiO_2$ is preferred from the viewpoint of reproducibility in film formability, stability, economic efficiency, and the like.

In the dielectric multilayer film, [sum T(H) of QWOT of dielectric film having relatively high refractive index]/[sum T(L) of QWOT of dielectric film having relatively low refractive index] is preferably 1.6 or more. Accordingly, it is easy to obtain a dielectric multilayer film that satisfies the above spectral characteristic of reflecting near-infrared light having a wavelength of 800 nm to 1100 nm and preventing reflection of visible light, and it is preferable that at least the dielectric multilayer film laminated on a light incident side satisfies such a ratio relationship.

Here, a quarter wave optical thickness (QWOT) is an optical thickness at λ/4 of a wavelength, and is calculated from a physical thickness using the following formula.

QWOT=physical thickness/central wavelength (500 nm)×4×refractive index at wavelength of 500 nm When the dielectric multilayer film is a laminate of a low refractive index film and a high refractive index film, the sum T(H) of QWOT is a sum of QWOT of the high refractive index film, and the sum T(L) of QWOT is a sum of QWOT of the low refractive index film.

When the dielectric multilayer film is a laminate of a low refractive index film and a medium refractive index film, the sum T(H) of QWOT is a sum of QWOT of the medium refractive index film, and the sum T(L) of QWOT is a sum of QWOT of the low refractive index film.

When the dielectric multilayer film is a laminate of a medium refractive index film and a high refractive index film, the sum T(H) of QWOT is a sum of QWOT of the high refractive index film, and the sum T(L) of QWOT is a sum of QWOT of the medium refractive index film.

The dielectric multilayer film is preferably a multilayer film in which a $H_2$ layer and an $M_2$ layer, each defined below, are alternately laminated in 10 or more layers. $H_2$ layer: a single layer having a refractive index of 1.8 or more and 2.5 or less and a QWOT of 1.1 or more and 3.5 or less; $M_2$ layer: a single layer or a multilayer that exists between two $H_2$ layers and have a sum of QWOT of 1.2 or more and 1.8 or less The specific laminated structure is a structure in which a single layer ($H_2$ layer) having a large refractive index and an optical thickness and a layer ($M_2$ layer) whose total optical thickness is within a predetermined range are alternately laminated in 10 or more layers. With such a structure, it is easy to obtain a dielectric multilayer film that reflects near-infrared light having a wavelength of 800 nm to 1200 nm and has a low reflectance for visible light.

The $M_2$ layer may be a single layer or a multilayer as long as it has a predetermined optical thickness. From the viewpoint of obtaining smoother spectral characteristics, it is preferable that the $M_2$ layer is composed of a multilayer, and a minimum thickness of a single layer is preferably 5 nm or more, and more preferably 10 nm or more. A refractive index of the dielectric film constituting the $M_2$ layer is preferably the same as or lower than a refractive index of the $H_2$ layer.

It is preferable that at least the dielectric multilayer film designed as a reflection film has the above specific laminated structure.

When the dielectric multilayer film designed as a reflection film has the above laminated structure, it is preferable that, of the $H_2$ layer and the $M_2$ layer, the layer closest to the near-infrared ray absorbing glass is the $H_2$ layer. The $H_2$ layer closest to the near-infrared ray absorbing glass may be directly laminated on the near-infrared ray absorbing glass, or another layer not corresponding to either the $H_2$ layer or the $M_2$ layer may be present between the $H_2$ layer closest to the near-infrared ray absorbing glass and the near-infrared ray absorbing glass.

In the dielectric multilayer film designed as a reflection film, a total number of laminated layers in the dielectric multilayer film is preferably 10 or more, more preferably 20 or more, and still more preferably 30 or more. However, when the total number of laminated layers increases, warpage or the like occurs or a thickness increases, so that the total number of laminated layers is preferably 110 or less, more preferably 80 or less, and still more preferably 60 or less.

The thickness (physical thickness) of the dielectric multilayer film designed as a reflection film is preferably 1 μm to 6 μm as a whole.

When the optical filter is mounted on an imaging device, the dielectric multilayer film on a sensor side is generally preferably designed as an anti-reflection layer. The total number of laminated layers in the dielectric multilayer film designed as an anti-reflection layer is preferably 40 or less, more preferably 30 or less, and still more preferably 20 or less, and is preferably 6 or more.

The thickness (physical thickness) of the dielectric multilayer film designed as an anti-reflection layer is preferably 0.2 μm to 1.0 μm as a whole.

For formation of the dielectric multilayer film, for example, a vacuum film formation process such as a CVD method, a sputtering method, or a vacuum deposition method, a wet film formation process such as a spraying method or a dipping method, or the like can be used.

When the optical filter is mounted on the imaging device, the dielectric multilayer film laminated on a glass surface is generally disposed on a lens side, and the dielectric multilayer film laminated on a resin film surface is generally disposed on a sensor side. Therefore, it is preferable that the optical filter according to the present embodiment is mounted such that the dielectric multilayer film 1 faces the lens side and the dielectric multilayer film 2 faces the sensor side.

<Resin Film>

The resin film in the optical filter according to the present embodiment contains a resin and a near-infrared ray absorbing dye. Here, the resin refers to a resin constituting the resin film.

As the near-infrared ray absorbing dye, a dye having a maximum absorption wavelength at 740 nm to 800 nm in the resin is preferred. When the dye has a maximum absorption wavelength at 740 nm to 800 nm, the near-infrared light absorption region of the fluorophosphate glass containing Cu or the like is on a short wavelength side, so that the spectral characteristics of the dye can be more effectively utilized when combined with glass.

Examples of the near-infrared ray absorbing dye include at least one selected from the group consisting of a cyanine dye, a phthalocyanine dye, a squarylium dye, a naphthalocyanine dye, and a diimonium dye, and one thereof or a plurality thereof as a mixture can be used. Among them, a squarylium dye and a cyanine dye are preferred from the viewpoint of being able to steeply absorb light in the 740 am to 800 nm region and thus being able to easily exert the effects of the present invention.

The content of the near-infrared ray absorbing dye in the resin film is preferably 0.1 parts by mass to 30 parts by mass, and more preferably 0.1 parts by mass to 20 parts by mass, with respect to 100 parts by mass of the resin. When two or more compounds are combined, the above content is a sum of respective compounds.

The resin film may contain other dyes, for example, an ultraviolet light-absorbing dye, as long as the effect of the present invention is not impaired.

Examples of the ultraviolet light-absorbing dye include an oxazole dye, a merocyanine dye, a cyanine dye, a naphthalimide dye, an oxadiazole dye, an oxazine dye, an oxazolidine dye, a naphthalic acid dye, a styryl dye, an anthracene dye, a cyclic carbonyl dye, and a triazole dye. Among them, the merocyanine dye is particularly preferred. These dyes may be used alone, or may be used in combination of two or more kinds thereof.

The resin is not limited as long as it is a transparent resin, and one or more kinds of transparent resins selected from a polyester resin, an acrylic resin, an epoxy resin, an ene-thiol resin, a polycarbonate resin, a polyether resin, a polyarylate resin, a polysulfone resin, a polyethersulfone resin, a poly (p-phenylene) resin, a polyarylene ether phosphine oxide resin, a polyamide resin, a polyimide resin, a polyamide-imide resin, a polyolefin resin, a cyclic olefin resin, a polyurethane resin, a polystyrene resin, and the like are used. These resins may be used alone, or may be used by mixing two or more kinds thereof.

From the viewpoint of spectral characteristics, a glass transition temperature (Tg), and adhesion of the resin film, one or more resins selected from a polyimide resin, a polycarbonate resin, a polyester resin, and an acrylic resin are preferred.

When a plurality of dyes are used, these dyes may be contained in the same resin film or may be contained in different resin films.

The resin film can be formed by dissolving or dispersing a dye, a resin on a raw material component of the resin, and respective components blended as necessary in a solvent to prepare a coating solution, applying the coating solution to a support, drying the coating solution, and further curing the coating solution as necessary. The support in this case may be the near-infrared ray absorbing glass used for the present filter, or may be a peelable support used only when the resin film is to be formed. The solvent may be a dispersion medium capable of stably dispersing components of a solvent capable of dissolving components.

The coating solution may contain a surfactant in order to improve voids due to fine bubbles, depressions due to adhesion of foreign substances and the like, and repelling in a drying process. Further, for the application of the coating solution, for example, a dip coating method, a cast coating method, or a spin coating method can be used. The coating solution is applied onto the support and then dried to form a resin film. In the case where the coating solution contains a raw material component of the transparent resin, a curing process such as thermal curing or photocuring is further performed.

The resin film can also be produced into a film shape by extrusion molding. The substrate can be produced by laminating the obtained film-shaped resin film on the phosphate glass and integrating the resin film and the phosphate glass by thermal press fitting or the like.

The optical filter may have one layer of the resin film, or may have two or more layers of the resin film. When the optical filter has two or more layers of the resin film, respective layers may have the same configuration or different configurations. When the optical filter has two or more layers of the resin film, they may all be laminated on the same main surface side of the near-infrared ray absorbing glass, or each may be laminated on a different main surface side.

A thickness of the resin film is 10 µm or less and preferably 5 µm or less from the viewpoint of in-plane thickness distribution and appearance quality in a substrate after coating and is preferably 0.5 µm or more from the viewpoint of exhibiting desired spectral characteristics at an appropriate dye concentration. When the optical filter has two or more layers of the resin film, a total thickness of the respective resin films is preferably within the above range.

The resin film in the optical filter according to the present embodiment preferably satisfies all of the following spectral characteristics (iv-1) to (iv-4):

(iv-1) an average internal transmittance $T_{(in)440-600(0deg)AVE}$ at a wavelength of 440 nm to 600 nm and an incident angle of 0 degrees is 90% or more (iv-2) a wavelength $IR\_T_{(in)50(0deg)}$ at which an internal transmittance is 50% at an incident angle of 0 degrees is in a wavelength range of 630 nm to 645 nm (iv-3) an absolute value of a difference between a wavelength $IR\_T_{(in)70(0deg)}$ at which an internal transmittance is 70% at an incident angle of 0 degrees and a wavelength $IR\_T_{(in)20(0deg)}$ at which an internal transmittance is 20% at an incident angle of 0 degrees, in a wavelength of 500 nm to 700 nm, is 60 nm or less (iv-4) an average internal transmittance $T_{(in)700-800(0deg)AVE}$ at a wavelength of 700 nm to 800 nm and an incident angle of 0 degrees is 5% or less.

The resin film has a high visible light transmittance as shown in the spectral characteristic (iv-1), a boundary region between a transmission region and an absorption region at a wavelength of 630 nm to 645 nm shown in the spectral characteristic (iv-2), steep absorption characteristics in the boundary region as shown in the spectral characteristic (iv-3), and a high shielding property for near-infrared light having a wavelength of 700 nm to 800 nm as shown in the spectral characteristic (iv-4).

The average internal transmittance $T_{(in)440-600(0deg)AVE}$ is more preferably 90.5% of more, and still more preferably 91% or more.

The wavelength $IR\_T_{(in)50(0deg)}$ is more preferably 632 nm to 640 nm, and still more preferably 634 nm to 640 nm.

The absolute value of the difference in (iv-3) is more preferably 57 nm or less, and still more preferably 55 nm or less.

The average internal transmittance $T_{(in)700-800(0deg)AVE}$ is more preferably 4% or less, and still more preferably 3% or less.

The substrate including the near-infrared ray absorbing glass and the resin film preferably satisfy all of the following spectral characteristics (iii-1) to (iii-3):

(iii-1) an average internal transmittance $T_{(in)440-600(0deg)AVE}$ at a wavelength of 440 nm to 600 nm and an incident angle of 0 degrees is 75% or more (iii-2) an average internal transmittance $T_{(in)700-800(0deg)AVE}$ at a wavelength of 700 nm to 800 nm and an incident angle of 0 degrees is 1.2% or less (iii-3) an average internal transmittance $T_{(in)800-1000(0deg)AVE}$ at a wavelength of 800 nm to 1000 nm and an incident angle of 0 degrees is 5% or less.

As shown in the spectral characteristics (iii-1) to (iii-3), the substrate that combines the glass and the near-infrared ray absorbing dye has high visible light transmissivity and high near-infrared absorption characteristics at 700 nm to 1000 nm.

The average internal transmittance $T_{(in)440-600(0deg)AVE}$ is more preferably 76% or more, and still more preferably 77% or more.

The average internal transmittance $T_{(in)700-800(0deg)AVE}$ is more preferably 1.1% or less, and still more preferably 1.05% or less.

The average internal transmittance $T_{(in)800-1000(0deg)AVE}$ is more preferably 4.5% or less, and still more preferably 4.0% or less.

The optical filter of the present embodiment may include, as another component, for example, a component (layer) that provides absorption by inorganic fine particles or the like that control transmission and absorption of light in a specific wavelength region. Specific examples of the inorganic fine particles include indium tin oxides (ITO), antimony-doped tin oxides (ATO), cesium tungstate, and lanthanum boride. The ITO fine particles and the cesium tungstate fine particles have a high visible light transmittance and have light absorbing properties in a wide range of an infrared wavelength region exceeding 1200 nm, and thus can be used in the case where shielding properties of infrared light are required.

For example, when the optical filter of the present embodiment is used in an imaging device such as a digital still camera, an imaging device having excellent color reproducibility can be provided. Such an imaging device includes a solid state image sensor, an imaging lens, and the optical filter of the present embodiment. The optical filter of the present embodiment can be used, for example, by being disposed between the imaging lens and the solid state image sensor, or by being directly attached to the solid state image sensor, the imaging lens, or the like of the imaging device via an adhesive layer.

As described above, the present description discloses the following optical filters and the like.

[1] An optical filter including:
a dielectric multilayer film 1;
a substrate including a near-infrared ray absorbing glass and a resin film; and
a dielectric multilayer film 2 in this order, in which
the resin film contains a near-infrared ray absorbing dye and a resin,
the near-infrared ray absorbing glass is a fluorophosphate glass containing P, Cu, and F, and
the optical filter satisfies all of the following spectral characteristics (i-1) to (i-5):
(i-1) an absolute value of a difference between an average transmittance $T_{440-600(0deg)AVE}$ at a wavelength of 440 nm to 600 nm and an incident angle of 0 degrees and an average transmittance $T_{440-600(0deg)AVE}$ at a wavelength of 440 nm to 600 nm and an incident angle of 60 degrees is 15% or less
(i-2) the average transmittance $T_{440-600(0deg)AVE}$ is 75% or more
(i-3) a wavelength $IR\_T_{50(0deg)}$ at which a transmittance is 50% at an incident angle of 0 degrees is in a wavelength range of 580 nm to 640 nm
(i-4) an average transmittance $T_{700-800(0deg)AVE}$ at a wavelength of 700 nm to 800 nm and an incident angle of 0 degrees is 1.1% or less
(i-5) an average transmittance $T_{800-1200(0deg)AVE}$ at a wavelength of 800 nm to 1200 nm and an incident angle of 0 degrees is 5% or less.

[2] The optical filter according to [1], in which the optical filter satisfies all of the following spectral characteristics (i-6) and (i-7):
(i-6) when a dielectric multilayer film 1 side is set as an incident direction, an average reflectance $R1_{440-650(5deg)AVE}$ at a wavelength of 440 nm to 650 nm and an incident angle of 5 degrees is 1.5% or less
(i-7) when a dielectric multilayer film 1 side is set as an incident direction, an average reflectance $R1_{850-1200(5deg)AVE}$ at a wavelength of 850 nm to 1200 nm and an incident angle of 5 degrees is 60% or more.

[3] The optical filter according to [1] or [2], in which the optical filter satisfies the following spectral characteristic (i-8):
(i-8) when a dielectric multilayer film 1 side is set as an incident direction, an average reflectance $R1_{440-650(60deg)AVE}$ at a wavelength of 440 nm to 650 nm and an incident angle of 60 degrees is 10% or less.

[4] The optical filter according to any one of [1] to [3], in which the optical filter satisfies all of the following spectral characteristics (i-9) and (i-10):
(i-9) when a dielectric multilayer film 2 side is set as an incident direction, an average reflectance $R2_{440-650(5deg)AVE}$ at a wavelength of 440 nm to 650 nm and an incident angle of 5 degrees is less than 2.0%
(i-10) when a dielectric multilayer film 2 side is set as an incident direction, an average reflectance $R2_{700-850\ (5deg)AVE}$ at a wavelength of 700 nm to 850 nm and an incident angle of 5 degrees is 1.2% or less.

[5] The optical filter according to any one of [1] to [4], in which the optical filter satisfies all of the following spectral characteristics (i-11) and (i-12):
(i-11) when a dielectric multilayer film 2 side is set as an incident direction, an average reflectance $R2_{440-650(60deg)AVE}$ at a wavelength of 440 nm to 650 nm and an incident angle of 60 degrees is less than 10%
(i-12) when a dielectric multilayer film 2 side is set as an incident direction, an average reflectance $R2_{700-850(60deg)AVE}$ at a wavelength of 700 nm to 850 nm and an incident angle of 60 degrees is 8% or less.

[6] The optical filter according to any one of [1] to [5], in which the optical filter satisfies the following spectral characteristic (i-13):
(i-13) when a dielectric multilayer film 1 side is set as an incident direction, an absolute value of a difference between a wavelength $IR\_R_{50(0deg)}$ at which a reflectance is 50% at an incident angle of 5 degrees in a wavelength range of 750 nm to 900 nm and a wavelength $IR\_T_{50(5deg)}$ at which a transmittance is 50% at an incident angle of 5 degrees in a wavelength range of 580 nm to 640 nm is 160 nm or more.

[7] The optical filter according to any one of [1] to [6], in which the optical filter satisfies all of the following spectral characteristics (i-14) and (i-15):
(i-14) an average value of absorption loss $amount_{700-800}$ at a wavelength of 700 nm to 800 nm is 25% or more
(i-15) an average value of absorption loss $amount_{850-1000}$ at a wavelength of 850 nm to 1000 nm is 17% or more
where, when a dielectric multilayer film 1 side is set as an incident direction, an absorption loss $amount_{X-Y}$ at a wavelength of X nm to Y nm is defined as follows:

$$(\text{Absorption loss amount}_{X-Y})\ [\%] = 100 - (\text{transmittance at an incident angle of 5 degrees}) - (\text{reflectance at an incident angle of 5 degrees}).$$

[8] The optical filter according to any one of [1] to [7], in which
the near-infrared ray absorbing glass has a thickness of 0.4 nm or less, and
the near-infrared ray absorbing glass satisfies all of the following spectral characteristics (ii-1) to (ii-3):
(ii-1) a wavelength $IR\_T_{50(0deg)}$ at which a transmittance is 50% at an incident angle of 0 degrees is in a wavelength range of 590 nm to 640 nm
(ii-2) a transmittance $T_{700(0deg)}$ at a wavelength of 700 nm and an incident angle of 0 degrees is 25% or less
(ii-3) an average transmittance $T_{700-800(0deg)AVE}$ at a wavelength of 700 nm to 800 nm and an incident angle of 0 degrees is 10% or less.

[9] The optical filter according to any one of [1] to [8], in which the substrate satisfies all of the following spectral characteristics (ii-1) to (ii-3):
(iii-1) an average internal transmittance $T_{(in)440-600(0deg)AVE}$ at a wavelength of 440 nm to 600 μm and an incident angle of 0 degrees is 75% or more
(iii-2) an average internal transmittance $T_{(in)700-800(0deg)AVE}$ at a wavelength of 700 nm to 800 nm and an incident angle of 0 degrees is 1.2% or less
(iii-3) an average internal transmittance $T_{(in)800-1000(0deg)AVE}$ at a wavelength of 800 nm to 1000 nm and an incident angle of 0 degrees is 5% or less.

[10] The optical filter according to any one of [1] to [9], in which the near-infrared ray absorbing dye contains a squarylium dye having a maximum absorption wavelength at 740 nm to 800 nm in the resin.

[11] The optical filter according to any one of [1] to [10], in which the resin film satisfies all of the following spectral characteristics (iv-1) to (iv-4):
(iv-1) an average internal transmittance $T_{(in)440-600(0deg)AVE}$ at a wavelength of 440 nm to 600 nm and an incident angle of 0 degrees is 90% or more (iv-2) a wavelength $IR\_T_{(in)50(0deg)}$ at which an internal transmittance is 50% at an incident angle of 0 degrees is in a wavelength range of 630 am to 645 nm (iv-3) an absolute value of a difference between a wavelength $IR\_T_{(in)70(0deg)}$ at which an internal transmittance is 70% at an incident angle of 0 degrees and a wavelength $IR\_T_{(in)20(0deg)}$ at which an internal transmittance is 20% at an incident angle of 0 degrees, in a wavelength of 500 nm to 700 nm, is 60 min or less (iv-4) an average internal transmittance $T(in)700\text{-}800(0deg)AVE$ at a wavelength of 700 nm to 800 µm and an incident angle of 0 degrees is 5% or less.

[12] The optical filter according to any one of [1] to [11], in which the near-infrared ray absorbing glass contains, in terms of mass %, $P^{5+}$: 30% to 70% %
$Al^{3+}$: 0% to 20%
$Li^+$: 0% to 20%,
$Na^+$: 0% to 25%,
$K^+$: 0% to 25%,
$Mg^{2+}$: 0% to 10%,
$Ca^{2+}$: 0% to 20%,
$Sr^{2+}$: 0% to 30%,
$Ba^{2+}$: 0% to 40%,
$\Sigma R^+$: 0.1% to 30% ($R^+$ is one or more components selected from $Li^+$, $Na^+$, and $K^+$),
$\Sigma R^{2+}$: 10% to 45% ($R^{2+}$ is one or more components selected from $Mg^{2+}$, $Ca^{2+}$, $Sr^{2+}$, and $Ba^{2+}$), and
$Cu^{2+}$: 1% to 20%, and is a fluorophosphate glass containing 5 mass % to 70 mass % by external ratio of $F^-$ when component elements other than F contained in the glass are taken as 100 mass %.

[13] An imaging device including the optical filter according to any one of [1] to [12].

EXAMPLES

Next, the present invention is described more specifically with reference to Examples.

For measurement of each spectral characteristic, an ultraviolet-visible spectrophotometer (UH-4150 type, manufactured by Hitachi High-Tech Corporation) was used.

The spectral characteristic in the case where an incident angle is not particularly specified is a value measured at an incident angle of 0 degrees (in a direction perpendicular to a main surface of an optical filter).

Dyes used in respective Examples are as follows.

Compound 1 (cyanine compound): synthesized based on a method described in Dyes and Pigments, 73, 344 to 352 (2007).

Compound 2 (squarylium compound): synthesized based on WO2017/135359.

Compound 3 (merocyanine compound): synthesized based on the description of German Patent No. 10109243.

Compound 4 (squarylium compound): synthesized based on JP2017-110209A.

Compound 5 (squarylium compound): synthesized based on WO2014/088063 and WO2016/133099.

[Chem.1]

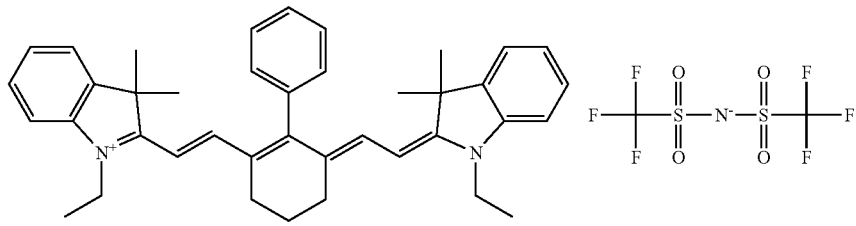

Compound 1

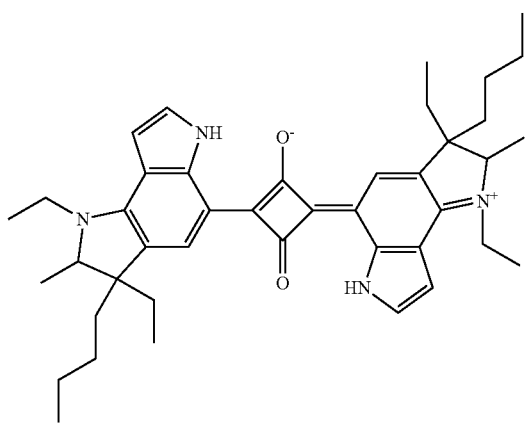

Compound 2

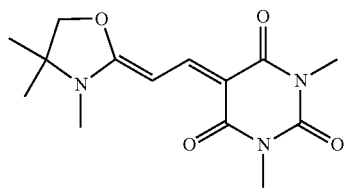

Compound 3

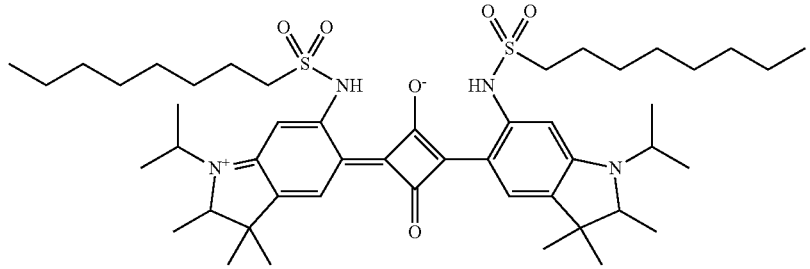

Compound 4

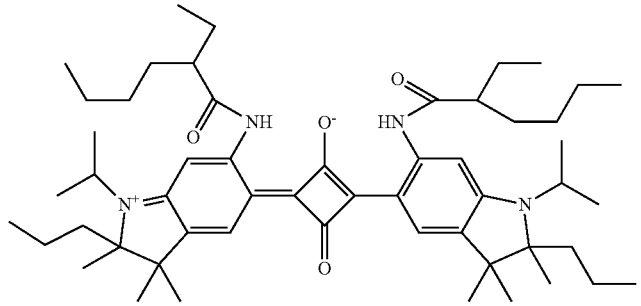

Compound 5

The maximum absorption wavelength of each dye in a polyimide resin is shown in Table 2 to be described later, <Spectral Characteristics of Glass>

As glasses used in Inventive Examples and Comparative Examples, glass A1, glass A2, glass B, glass C, glass D1, and glass D2 shown in Table 1 were prepared.

The glass A1, the glass A2, the glass B, the glass D1, and the glass D2 are a fluorophosphate glass, and the glass C is a phosphate glass.

The spectral characteristics of each glass are shown in the following Table 1.

TABLE 1

| Glass | | Glass A1 | Glass A2 | Glass B | Glass C | Glass D1 | Glass D2 |
|---|---|---|---|---|---|---|---|
| | Type | Fluorophosphate | Fluorophosphate | Fluorophosphate | Phosphate | Fluorophosphate | Fluorophosphate |
| | Thickness [mm] | 0.2 | 0.4 | 0.2 | 0.2 | 0.2 | 0.4 |
| Glass composition [mass %] | $P^{5+}$ | 34.8 | 34.8 | 36.5 | 59.8 | 34.9 | 34.9 |
| | $Al^{3+}$ | 6.6 | 6.6 | 7.4 | 8.4 | 7.9 | 7.9 |
| | $B^{3+}$ | 0.0 | 0.0 | 0.0 | 0.8 | 0.0 | 0.0 |
| | $Li^+$ | 5.1 | 5.1 | 5.2 | 0.0 | 0.0 | 0.0 |
| | $Na^+$ | 0.0 | 0.0 | 0.0 | 10.9 | 7.3 | 7.3 |
| | $K^+$ | 0.0 | 0.0 | 0.0 | 0.0 | 13.7 | 13.7 |
| | $Mg^{2+}$ | 2.1 | 2.1 | 2.4 | 0.0 | 0.0 | 0.0 |
| | $Ca^{2+}$ | 5.0 | 5.0 | 5.6 | 0.0 | 4.8 | 4.8 |
| | $Sr^{2+}$ | 14.6 | 14.6 | 14.4 | 0.0 | 7.2 | 7.2 |
| | $Ba^{2+}$ | 22.3 | 22.3 | 24.4 | 7.8 | 15.5 | 15.5 |
| | $Cu^{2+}$ | 9.5 | 9.5 | 4.1 | 12.2 | 8.7 | 8.7 |
| External ratio [mass %] | F– | 12.0 | 12.0 | 14.0 | 0.0 | 14.2 | 14.2 |
| Total | | 100.0 | 100.0 | 100.0 | 100.0 | 100.0 | 100.0 |
| Spectral characteristics of glass | 0 deg incident light wavelength [nm] at which transmittance is 50% | 620 | 594 | 671 | 649 | 636 | 605 |
| | 0 deg incident light transmittance [%] at wavelength of 700 nm | 9.62 | 1.02 | 38.77 | 23.13 | 18.22 | 3.64 |

TABLE 1-continued

| | | | | | | |
|---|---|---|---|---|---|---|
| 0 deg incident light average transmittance [%] at wavelength of 700 nm to 800 nm | 3.85 | 0.22 | 26.77 | 10.27 | 8.67 | 1.01 |

As described above, it is understood that the fluorophosphate glass has a high transmittance in a visible light region and is excellent in light shielding properties in a near-infrared region, and particularly excellent in light shielding properties for light having a wavelength of 700 nm to 800 nm.

Example 1: Optical Filter

A resin film was formed on one main surface of the fluorophosphate glass substrate A1 by the following method to produce a substrate including a glass substrate and a resin film. First, a polyimide resin ("C3G30G" (trade name), manufactured by Mitsubishi Gas Chemical Company, Inc., refractive index: 1.59) was dissolved in a mixture of γ-butyrolactone (GBL):cyclohexanone=1:1 (mass ratio) to prepare a polyimide resin solution having a resin concentration of 8.5 mass %, Each of the above dyes was added to a resin solution at a concentration shown in the following Table 2 per 100 parts by mass of resin, and the mixture was stirred and dissolved at 50° C. for 2 hours to obtain a coating solution. The obtained coating solution was applied to a glass substrate by a spin coating method to form a resin film 1 having a thickness of about 3 μm.

On the other main surface of the glass substrate. $TiO_2$ and $SiO_2$ were laminated by deposition in a configuration shown in the following Table 3 to form a dielectric multilayer film 1. On the surface of the resin film, $TiO_2$ and $SiO_2$ were laminated by deposition in a configuration shown in the following Table 4 to form a dielectric multilayer film 2.

In this manner, an optical filter having a configuration of dielectric multilayer film 1 (Table 3)/fluorophosphate glass A1/resin film 1/dielectric multilayer film 2 (Table 4) was prepared.

Examples 2 to 12: Optical Filters

Optical filters were prepared in the same manner as in Example 1, except that the glass, the resin film, the dielectric multilayer film 1, and the dielectric multilayer film 2 were changed to the following configurations. The configuration of each dielectric multilayer film is shown in Tables 3 to 6.

Example 2: dielectric multilayer film 1 (Table 3)/fluorophosphate glass A2/resin filmi 1/dielectric multilayer film 2 (Table 4)

Example 3: dielectric multilayer film 1 (Table 3)/fluorophosphate glass B/resin film 1/dielectric multilayer film 2 (Table 4)

Example 4: dielectric multilayer film 1 (Table 3)/fluorophosphate glass C/resin film 1/dielectric multilayer film 2 (Table 4)

Example 5: dielectric multilayer film 1 (Table 5)/fluorophosphate glass A1/resin film 1/dielectric multilayer film 2 (Table 4)

Example 6: dielectric multilayer film 1 (Table 3)/fluorophosphate glass A1/resin film 2/dielectric multilayer film 2 (Table 4)

Example 7: dielectric multilayer film 1 (Table 3)/fluorophosphate glass D2/resin film 1/dielectric multilayer film 2 (Table 4)

Example 8: dielectric multilayer film 1 (Table 3)/fluorophosphate glass D1/resin filmi 3/dielectric multilayer film 2 (Table 4)

Example 9: dielectric multilayer film 1 (Table 6)/fluorophosphate glass D1/resin film 3/dielectric multilayer film 2 (Table 4)

Example 10: dielectric multilayer film 1 (Table 6)/fluorophosphate glass D2/resin film 3/dielectric multilayer film 2 (Table 4)

Example 11: dielectric multilayer film 1 (Table 6)/fluorophosphate glass D1/resin film 4/dielectric multilayer film 2 (Table 4)

Example 12: dielectric multilayer film 1 (Table 6)/fluorophosphate glass D2/resin film 4/dielectric multilayer film 2 (Table 4)

For each resin film, a spectral transmittance curve was measured at an incident angle of 0 degrees in a wavelength range of 300 nm to 1200 nm using an ultraviolet-visible spectrophotometer. The spectral characteristics of each resin film were evaluated by an internal transmittance of the resin film formed on the transparent glass substrate in order to avoid an influence of reflection at an air interface and a glass interface.

Results are shown in the following Table 2.

For each substrate (resin film and glass substrate), spectral transmittance curves at an incident angle of 0 degrees in a wavelength range of 300 nm to 1200 nm were measured using the ultraviolet-visible spectrophotometer. The spectral characteristics of each substrate were evaluated by the internal transmittance in order to avoid the influence of reflection at an air interface and a glass interface.

Results are shown in the following table 6.

With respect to each of the optical filters, spectral transmittance curves at an incident angle of 0 degrees and an incident angle of 60 degrees and a spectral reflectance curve at an incident angle of 5 degrees in a wavelength range of 300 nm to 1200 am were measured using the ultraviolet-visible spectrophotometer.

Results are shown in the following Tables 7 and 8.

Figure 2:
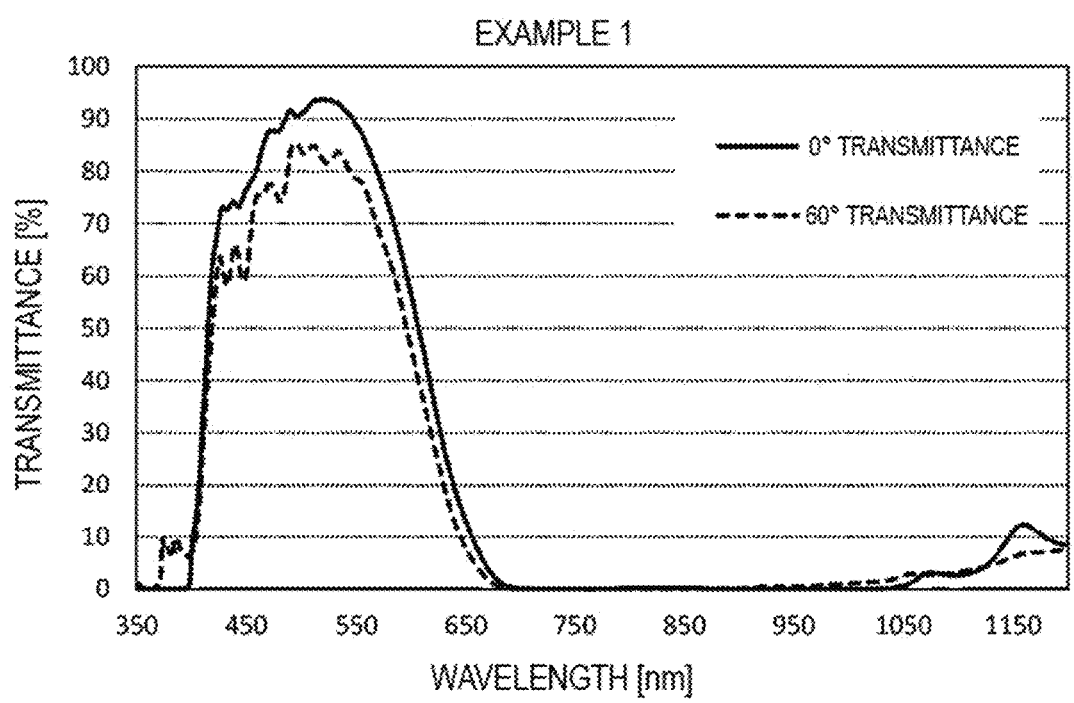
FIG. 2 is a diagram illustrating spectral transmittance curves (0 degree transmittance, 60 degree transmittance) of an optical filter in Example L.
Figure 3:
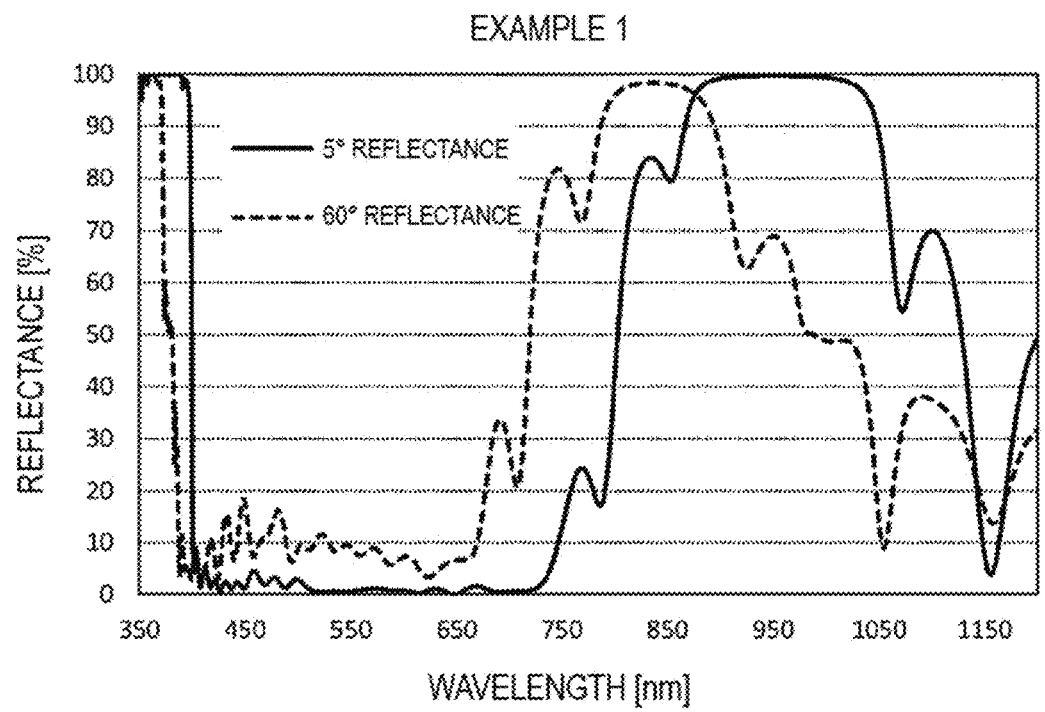
FIG. 3 is a diagram illustrating spectral reflectance curves (5 degree reflectance, 60 degree reflectance, dielectric multilayer film 1 side) of the optical filter in Example 1.
Figure 4:
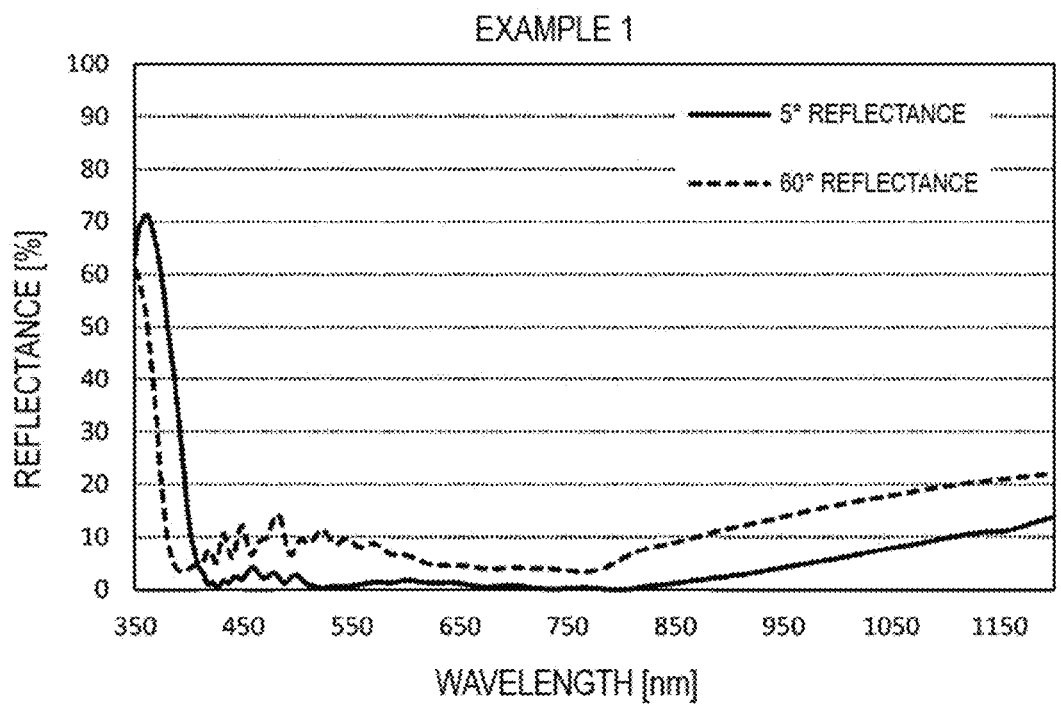
FIG. 4 is a diagram illustrating spectral reflectance curves (5 degree reflectance, 60 degree reflectance, dielectric multilayer film 2 side) of the optical filter in Example 1.
Figure 5:
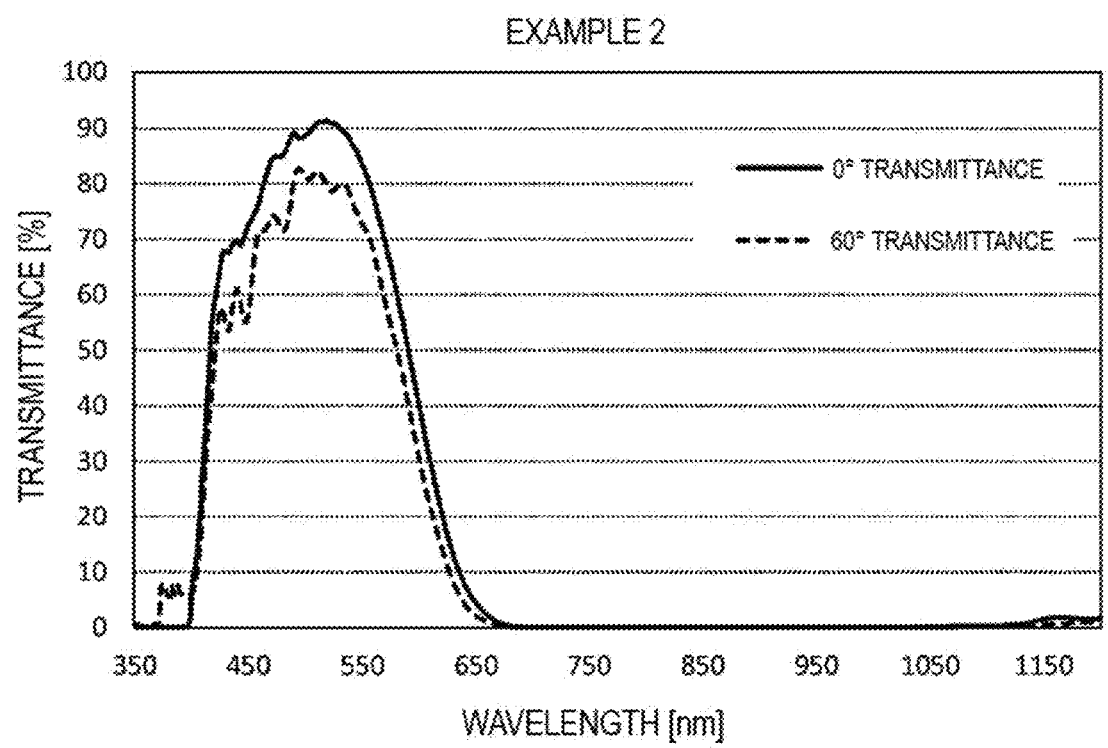
FIG. 5 is a diagram illustrating spectral transmittance curves (0 degree transmittance, 60 degree transmittance) of an optical filter in Example 2.
Figure 6:
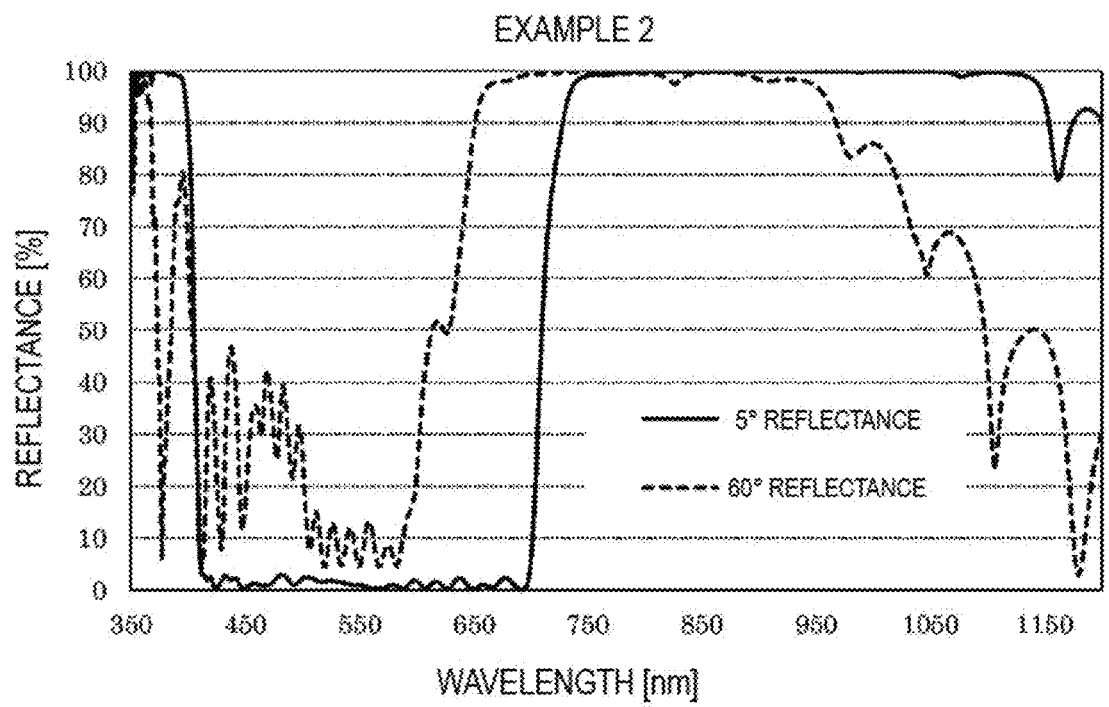
FIG. 6 is a diagram illustrating spectral reflectance curves (5 degree reflectance, 60 degree reflectance, dielectric multilayer film 1 side) of the optical filter in Example 2.
Figure 7:
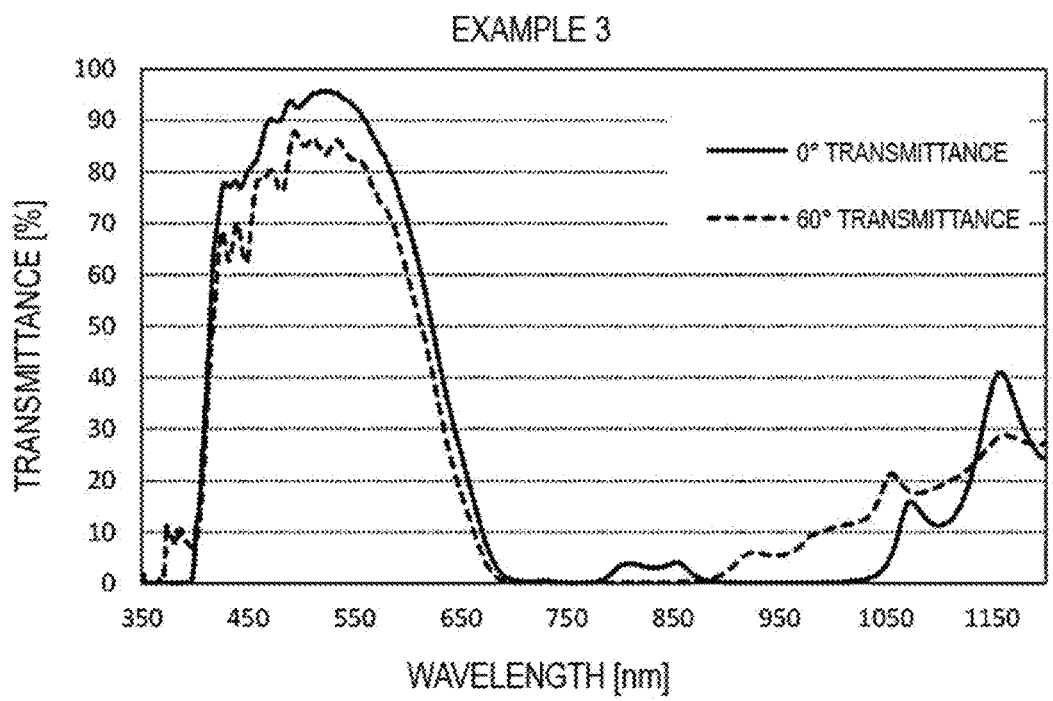
FIG. 7 is a diagram illustrating spectral transmittance curves (0 degree transmittance, 60 degree transmittance) of an optical filter in Example 3.
Figure 8:
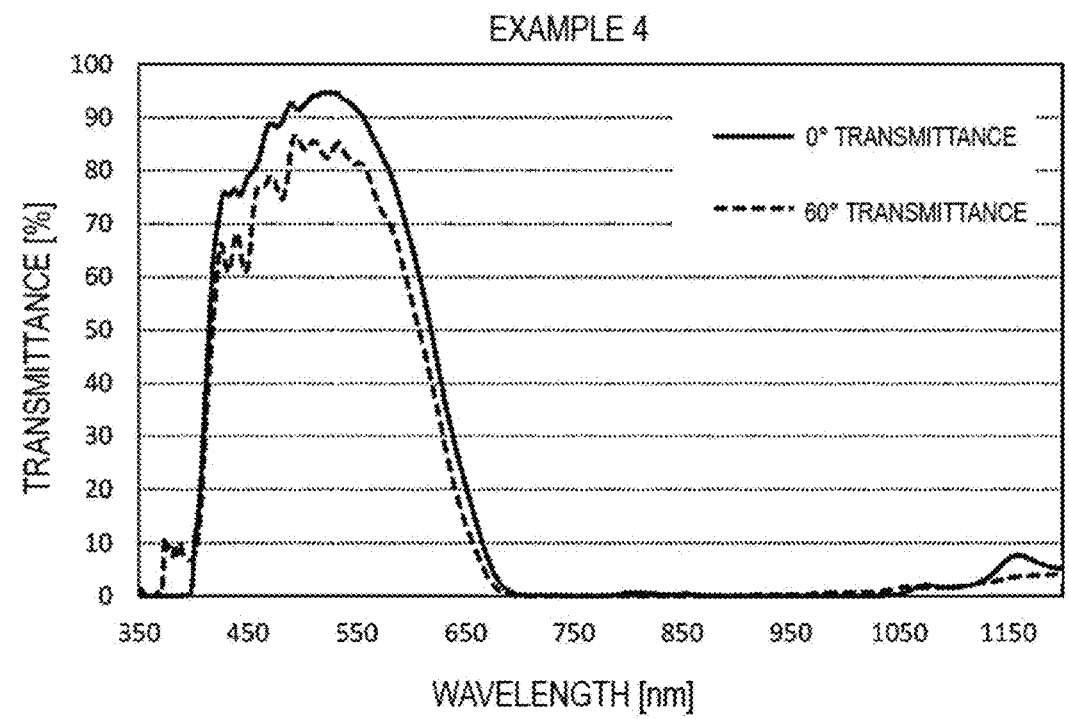
FIG. 8 is a diagram illustrating spectral transmittance curves (0 degree transmittance, 60 degree transmittance) of an optical filter in Example 4.
Figure 9:
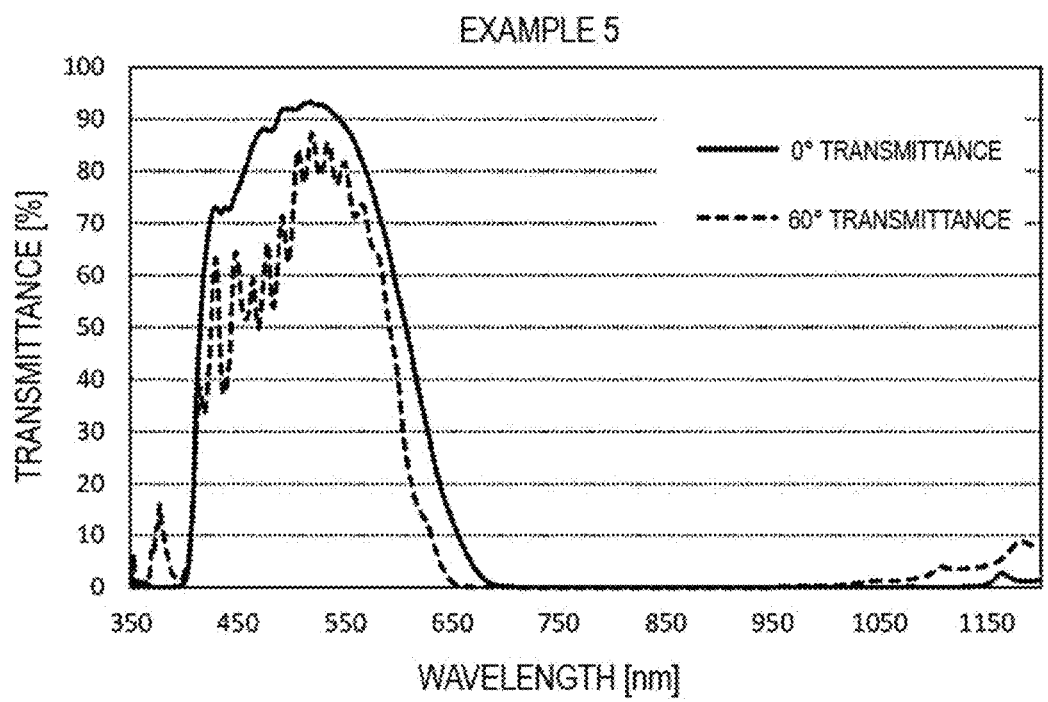
FIG. 9 is a diagram illustrating spectral transmittance curves (0 degree transmittance, 60 degree transmittance) of an optical filter in Example 5.
Figure 10:
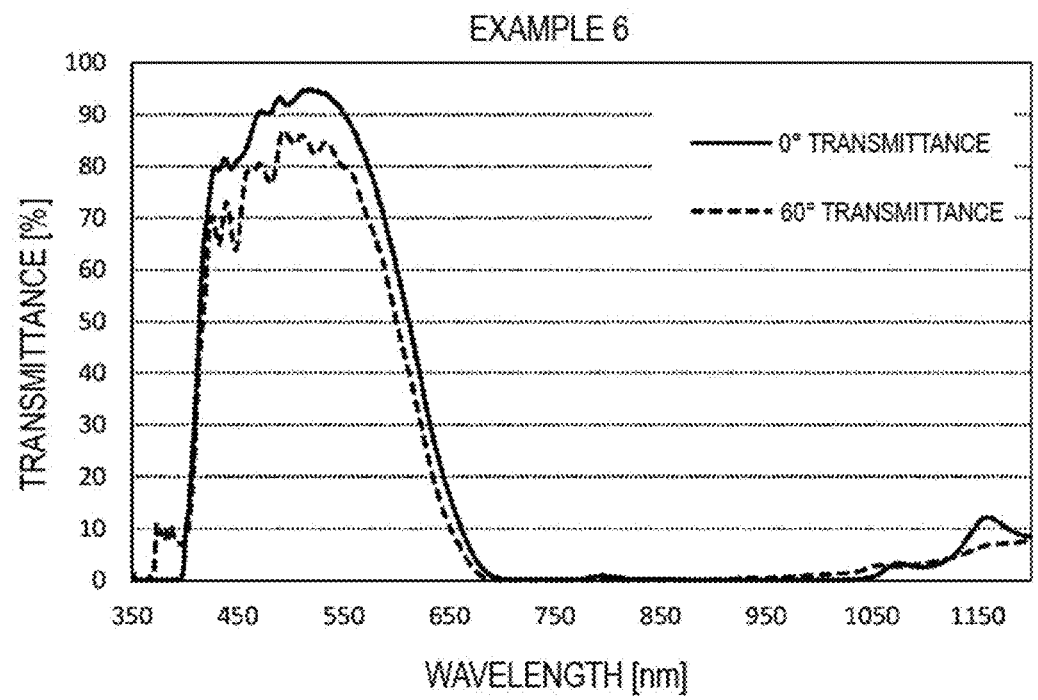
FIG. 10 is a diagram illustrating spectral transmittance curves (0 degree transmittance; 60 degree transmittance) of an optical filter in Example 6.

FIG. 2 illustrates a spectral transmittance curve of the optical filter in Example 1, FIG. 3 illustrates a spectral reflectance curve when an incident direction is on a dielectric multilayer film 1 side, and FIG. 4 illustrates a spectral reflectance curve when the incident direction is on a dielectric multilayer film 2 side. FIG. 5 illustrates a spectral transmittance curve of the optical filter in Example 2, and FIG. 6 illustrates a spectral reflectance curve when the incident direction is on the dielectric multilayer film 1 side. FIGS. 7 to 10 illustrate spectral transmittance curves of the optical filters in Examples 3 to 6, respectively.

Examples 1 and 2, Example 4, and Examples 6 to 12 are Inventive Examples, and Examples 3 and 5 are Comparative Examples.

TABLE 2

|  |  | Resin film 1 | Resin film 2 | Resin film 3 | Resin film 4 |
|---|---|---|---|---|---|
| Added amount (mass %) of dye | Compound 1 ($\lambda$MAX: 772 nm) | 3.6 | — | — | — |
|  | Compound 2 ($\lambda$MAX: 752 nm) | 3.6 | 3.6 | 4.7 | 6.4 |
|  | Compound 3 ($\lambda$MAX: 397 nm) | 2.5 | 2.5 | 4.9 | 6.9 |
|  | Compound 4 ($\lambda$MAX: 706 nm) | 4.0 | 4.0 | — | — |
|  | Compound 5 ($\lambda$MAX: 722 nm) | — | — | 1.5 | — |
|  | Total | 13.7 | 10.1 | 11.0 | 13.3 |
| Spectral characteristics of resin film | 0 deg incident light average internal transmittance [%] at wavelength of 440 nm to 600 nm | 91.44 | 94.29 | 96.03 | 95.36 |
|  | 0 deg incident light wavelength [nm] at which internal transmittance is 50% | 636 | 648 | 676 | 678 |
|  | 0 deg incident light absolute value [nm] of difference between wavelength at which internal transmittance is 20% and wavelength at which internal transmittance is 70% in wavelength of 500 nm to 700 nm | 53 | 48 | 51 | 56 |
|  | 0 deg incident light average internal transmittance [%] at wavelength of 700 nm to 800 nm | 2.66 | 13.83 | 17.08 | 15.16 |

TABLE 3

Example 1, Example 2, Example 3, Example 4, Example 6: Dielectric multilayer film 1

| Film number | Film material | Physical thickness [nm] |
|---|---|---|
| 1 | TiO$_2$ | 13.46 |
| 2 | SiO$_2$ | 35.91 |
| 3 | TiO$_2$ | 122.19 |
| 4 | SiO$_2$ | 54.43 |
| 5 | TiO$_2$ | 16.5 |
| 6 | SiO$_2$ | 56.34 |
| 7 | TiO$_2$ | 114.35 |
| 8 | SiO$_2$ | 56.99 |
| 9 | TiO$_2$ | 13.78 |
| 10 | SiO$_2$ | 56.98 |
| 11 | TiO$_2$ | 105.53 |
| 12 | SiO$_2$ | 50.31 |
| 13 | TiO$_2$ | 13.84 |
| 14 | SiO$_2$ | 53.62 |
| 15 | TiO$_2$ | 104.72 |
| 16 | SiO$_2$ | 56.61 |
| 17 | TiO$_2$ | 13.45 |
| 18 | SiO$_2$ | 54.46 |
| 19 | TiO$_2$ | 106.8 |
| 20 | SiO$_2$ | 57.43 |
| 21 | TiO$_2$ | 14.28 |
| 22 | SiO$_2$ | 58.28 |
| 23 | TiO$_2$ | 114.06 |
| 24 | SiO$_2$ | 62.37 |
| 25 | TiO$_2$ | 13.85 |
| 26 | SiO$_2$ | 61.9 |
| 27 | TiO$_2$ | 118.14 |
| 28 | SiO$_2$ | 63.3 |
| 29 | TiO$_2$ | 13.92 |
| 30 | SiO$_2$ | 60.87 |
| 31 | TiO$_2$ | 121.02 |
| 32 | SiO$_2$ | 53.44 |
| 33 | TiO$_2$ | 20 |
| 34 | SiO$_2$ | 49.62 |
| 35 | TiO$_2$ | 127.66 |
| 36 | SiO$_2$ | 40.8 |
| 37 | TiO$_2$ | 27.53 |
| 38 | SiO$_2$ | 40.05 |
| 39 | TiO$_2$ | 130.36 |
| 40 | SiO$_2$ | 44.52 |
| 41 | TiO$_2$ | 22.59 |
| 42 | SiO$_2$ | 47.67 |
| 43 | TiO$_2$ | 122.93 |
| 44 | SiO$_2$ | 52.55 |
| 45 | TiO$_2$ | 16.77 |
| 46 | SiO$_2$ | 48.14 |
| 47 | TiO$_2$ | 111.04 |
| 48 | SiO$_2$ | 88.3 |

TABLE 4

Example 1 to Example 12: Dielectric multilayer film 2

| Film number | Film material | Physical thickness [nm] |
|---|---|---|
| 1 | TiO$_2$ | 8.99 |
| 2 | SiO$_2$ | 62.65 |
| 3 | TiO$_2$ | 23.88 |
| 4 | SiO$_2$ | 25.54 |
| 5 | TiO$_2$ | 76.79 |
| 6 | SiO$_2$ | 13.20 |
| 7 | TiO$_2$ | 28.74 |
| 8 | SiO$_2$ | 103.77 |

TABLE 5

Example 5: Dielectric multilayer film 1

| Film number | Film material | Physical thickness [nm] |
|---|---|---|
| 1 | TiO$_2$ | 12.39 |
| 2 | SiO$_2$ | 36.02 |
| 3 | TiO$_2$ | 112.83 |
| 4 | SiO$_2$ | 179.08 |
| 5 | TiO$_2$ | 111.35 |
| 6 | SiO$_2$ | 185.42 |
| 7 | TiO$_2$ | 111.64 |
| 8 | SiO$_2$ | 186.87 |

TABLE 5-continued

Example 5: Dielectric multilayer film 1

| Film number | Film material | Physical thickness [nm] |
|---|---|---|
| 9 | TiO$_2$ | 110.92 |
| 10 | SiO$_2$ | 185.47 |
| 11 | TiO$_2$ | 110.36 |
| 12 | SiO$_2$ | 182.41 |
| 13 | TiO$_2$ | 104.66 |
| 14 | SiO$_2$ | 174.4 |
| 15 | TiO$_2$ | 98.8 |
| 16 | SiO$_2$ | 167.23 |
| 17 | TiO$_2$ | 97.6 |
| 18 | SiO$_2$ | 170.25 |
| 19 | TiO$_2$ | 100.42 |
| 20 | SiO$_2$ | 169.72 |
| 21 | TiO$_2$ | 95.07 |
| 22 | SiO$_2$ | 159.59 |
| 23 | TiO$_2$ | 88.1 |
| 24 | SiO$_2$ | 150.47 |
| 25 | TiO$_2$ | 84.87 |
| 26 | SiO$_2$ | 146.7 |
| 27 | TiO$_2$ | 84.15 |
| 28 | SiO$_2$ | 145.14 |
| 29 | TiO$_2$ | 84.06 |
| 30 | SiO$_2$ | 143.34 |
| 31 | TiO$_2$ | 84.45 |
| 32 | SiO$_2$ | 146.67 |
| 33 | TiO$_2$ | 83.68 |
| 34 | SiO$_2$ | 147.91 |
| 35 | TiO$_2$ | 83.85 |
| 36 | SiO$_2$ | 148.12 |
| 37 | TiO$_2$ | 89.24 |
| 38 | SiO$_2$ | 156.89 |
| 39 | TiO$_2$ | 87.45 |
| 40 | SiO$_2$ | 75.52 |

TABLE 6

Example 9 to Example 12: Dielectric multilayer film 1

| Film number | Film material | Physical thickness [nm] |
|---|---|---|
| 1 | Al$_2$O$_3$ | 12.00 |
| 2 | TiO$_2$ | 12.00 |
| 3 | SiO$_2$ | 34.15 |
| 4 | TiO$_2$ | 117.29 |
| 5 | SiO$_2$ | 39.59 |
| 8 | TiO$_2$ | 23.07 |
| 7 | SiO$_2$ | 41.67 |
| 8 | TiO$_2$ | 116.75 |
| 9 | SiO$_2$ | 45.18 |
| 10 | TiO$_2$ | 19.22 |
| 11 | SiO$_2$ | 45.29 |
| 12 | TiO$_2$ | 111.37 |
| 13 | SiO$_2$ | 51.56 |
| 14 | TiO$_2$ | 15.70 |
| 15 | SiO$_2$ | 53.65 |
| 16 | TiO$_2$ | 110.69 |
| 17 | SiO$_2$ | 53.86 |
| 18 | TiO$_2$ | 14.69 |
| 19 | SiO$_2$ | 53.30 |
| 20 | TiO$_2$ | 107.31 |
| 21 | SiO$_2$ | 55.26 |
| 22 | TiO$_2$ | 12.93 |
| 23 | SiO$_2$ | 61.3 |
| 24 | TiO$_2$ | 109.66 |
| 25 | SiO$_2$ | 66.79 |
| 26 | TiO$_2$ | 12.00 |
| 27 | SiO$_2$ | 62.86 |
| 28 | TiO$_2$ | 118.46 |
| 29 | SiO$_2$ | 48.22 |
| 30 | TiO$_2$ | 23.55 |
| 31 | SiO$_2$ | 40.27 |
| 32 | TiO$_2$ | 137.00 |
| 33 | SiO$_2$ | 24.46 |
| 34 | TiO$_2$ | 39.16 |
| 35 | SiO$_2$ | 22.25 |
| 36 | TiO$_2$ | 144.97 |
| 37 | SiO$_2$ | 29.42 |
| 38 | TiO$_2$ | 30.99 |
| 39 | SiO$_2$ | 34.81 |
| 40 | TiO$_2$ | 126.83 |
| 41 | SiO$_2$ | 48.34 |
| 42 | TiO$_2$ | 19.43 |
| 43 | SiO$_2$ | 50.32 |
| 44 | TiO$_2$ | 116.83 |
| 45 | SiO$_2$ | 49.21 |
| 46 | TiO$_2$ | 18.77 |
| 47 | SiO$_2$ | 44.15 |
| 48 | TiO$_2$ | 103.58 |
| 49 | SiO$_2$ | 84.86 |

TABLE 7

| | | Example 1 | Example 2 | Example 3 | Example 4 | Example 5 | Example 6 |
|---|---|---|---|---|---|---|---|
| Dielectric multilayer film 2 | Number of laminated layers | 8 L | 8 L | 8 L | 8 L | 8 L | 8 L |
| | Thickness [μm] | 0.3 | 0.3 | 0.3 | 0.3 | 0.3 | 0.3 |
| Resin film | | Resin film 1 | Resin film 1 | Resin film 1 | Resin film 1 | Resin film 1 | Resin film 2 |
| Glass | Type | Glass A1 Fluoro-phosphate | Glass A2 Fluoro-phosphate | Glass B Fluoro-phosphate | Glass C Phosphate | Glass A1 Fluoro-phosphate | Glass A1 Fluoro-phosphate |
| | Thickness [mm] | 0.2 | 0.4 | 0.2 | 0.2 | 0.2 | 0.2 |
| Dielectric multilayer film 1 | Number of laminated layers | 48 L | 48 L | 48 L | 48 L | 40 L | 48 L |
| | Thickness [μm] | 2.9 | 2.9 | 2.9 | 2.9 | 4.9 | 2.9 |
| Spectral characteristics of optical filter | [440-600 nm, 0 deg average transmittance − 440-600 nm, 60 deg average transmittance] [%] | 10.0 | 10.1 | 9.8 | 9.9 | 16.8 | 9.9 |
| | 440-600 nm, 0 deg average transmittance [%] | 83.8 | 78.1 | 88.1 | 86.6 | 83.7 | 86.2 |
| | Wavelength [nm] at which transmittance is 50% at incident angle of 0 deg | 607 | 590 | 623 | 618 | 607 | 611 |
| | 700-800 nm, 0 deg average transmittance [%] | 0.1 | 0.0 | 0.5 | 0.2 | 0.0 | 0.3 |
| | 800-1200 nm, 0 deg average transmittance [%] | 2.3 | 0.3 | 8.9 | 1.5 | 0.2 | 2.3 |
| | Multilayer film 1 side, 440-650 nm, 5 deg average reflectance [%] | 1.2 | 1.1 | 13 | 1.3 | 1.4 | 13 |
| | Multilayer film 1 side, 850-1200 nm, 5 deg average reflectance [%] | 75.7 | 75.6 | 76.0 | 75.8 | 98.2 | 75.7 |

TABLE 7-continued

|  |  | Example 1 | Example 2 | Example 3 | Example 4 | Example 5 | Example 6 |
|---|---|---|---|---|---|---|---|
|  | Multilayer film 1 side, 440-650 nm, 60 deg average reflectance [%] | 8.5 | 8.2 | 8.9 | 8.8 | 27.0 | 8.7 |
|  | Multilayer film 2 side, 440-650 nm, 5 deg average reflectance [%] | 1.5 | 1.5 | 1.5 | 1.5 | 1.5 | 1.5 |
|  | Multilayer film 2 side, 700-850 nm, 5 deg average reflectance [%] | 0.4 | 0.4 | 1.0 | 0.4 | 0.4 | 0.5 |
|  | Multilayer film 2 side, 440-650 nm, 60 deg average reflectance [%] | 8.1 | 7.6 | 8.5 | 8.4 | 13.2 | 8.3 |
|  | Multilayer film 2 side, 700-850 nm, 60 deg average reflectance [%] | 5.1 | 5.1 | 5.5 | 5.2 | 5.1 | 5.3 |
|  | Multilayer film 1 side, difference [nm] between wavelength at which reflectance is 50% at incident angle of 5 deg in wavelength of 750 nm to 900 nm and wavelength at which transmittance is 50% at incident angle of 5 deg in wavelength of 580 nm to 640 nm | 196 | 213 | 180 | 185 | 103 | 191 |
|  | Average value [%] of absorption loss amount at 700-800 | 57.9 | 58.1 | 55.2 | 58.1 | 0.1 | 57.4 |
|  | Average value [%] of absorption loss amount at 850-1000 | 20.4 | 20.7 | 16.8 | 20.5 | 0.3 | 20.4 |
| Spectral characteristics of substrate | 440-600 nm, 0 deg average internal transmittance [%] | 84.1 | 78.1 | 88.7 | 87.1 | 84.1 | 86.7 |
|  | 700-800 nm, 0 deg average internal transmittance [%] | 0.1 | 0.0 | 0.6 | 0.2 | 0.1 | 0.3 |
|  | 800-1000 nm, 0 deg average internal transmittance [%] | 3.9 | 0.2 | 28.2 | 2.9 | 3.9 | 3.9 |

TABLE 8

|  |  | Example 7 | Example 8 | Example 9 | Example 10 | Example 11 | Example 12 |
|---|---|---|---|---|---|---|---|
| Dielectric multilayer film 2 | Number of laminated layers | 8 L | 8 L | 8 L | 8 L | 8 L | 8 L |
|  | Thickness [μm] | 0.3 | 0.3 | 0.3 | 0.3 | 0.3 | 0.3 |
| Resin film |  | Resin film 1 | Resin film 1 | Resin film 1 | Resin film 1 | Resin film 1 | Resin film 2 |
| Glass | Type | Glass D2 Fluoro-phosphate | Glass D1 Fluoro-phosphate | Glass D1 Fluoro-phosphate | Glass D2 Fluoro-phosphate | Glass D1 Fluoro-phosphate | Glass D2 Fluoro-phosphate |
|  | Thickness [mm] | 0.4 | 0.2 | 0.2 | 0.4 | 0.2 | 0.4 |
| Dielectric multilayer film 1 | Number of laminated layers | 48 L | 48 L | 49 L | 49 L | 49 L | 49 L |
|  | Thickness [μm] | 2.9 | 2.9 | 2.9 | 2.9 | 4.9 | 2.9 |
| Spectral characteristics of optical filter | [440-600 nm, 0 deg average transmittance − 440-600 nm, 60 deg average transmittance] [%] | 10.3 | 10.1 | 9.1 | 9.4 | 9.1 | 9.4 |
|  | 440-600 nm, 0 deg average transmittance [%] | 80.7 | 85.3 | 89.3 | 84.4 | 88.7 | 83.8 |
|  | Wavelength [nm] at which transmittance is 50% at incident angle of 0 deg | 595 | 612 | 627 | 603 | 627 | 603 |
|  | 700-800 nm, 0 deg average transmittance [%] | 0.01 | 0.11 | 0.95 | 0.10 | 1.04 | 0.13 |
|  | 800-1200 nm, 0 deg average transmittance [%] | 0.4 | 2.6 | 3.4 | 0.5 | 3.4 | 0.5 |
|  | Multilayer film 1 side, 440-650 nm, 5 deg average reflectance [%] | 1.2 | 1.3 | 1.2 | 1.1 | 1.2 | 1.1 |
|  | Multilayer film 1 side, 850-1200 nm, 5 deg average reflectance 1% ] | 75.9 | 75.9 | 65.6 | 65.5 | 65.6 | 65.5 |
|  | Multilayer film 1 side, 440-650 nm, 60 deg average reflectance [%] | 8.4 | 8.7 | 8.0 | 7.6 | 8.0 | 7.5 |
|  | Multilayer film 2 side, 440-650 nm, 5 deg average reflectance [%] | 1.5 | 1.6 | 1.4 | 1.4 | 1.5 | 1.4 |
|  | Multilayer film 2 side, 700-850 nm, 5 deg average reflectance [%] | 0.4 | 0.4 | 0.6 | 0.5 | 0.5 | 0.5 |
|  | Multilayer film 2 side, 440-650 nm, 60 deg average reflectance [%] | 7.9 | 8.3 | 8.0 | 7.6 | 8.0 | 7.5 |
|  | Multilayer film 2 side, 700-850 nm, 60 deg average reflectance [%] | 5.2 | 5.2 | 6.4 | 6.4 | 6.3 | 6.3 |
|  | Multilayer film 1 side, difference [nm] between wavelength at which reflectance is 50% at incident angle of 5 deg in wavelength of 750 nm to 900 nm and wavelength at which transmittance is 50% at incident angle of 5 deg in wavelength of 580 nm to 640 nm | 208 | 192 | 166 | 190 | 166 | 190 |
|  | Average value [%] of absorption loss amount at 700-800 | 59.0 | 58.5 | 28.6 | 29.4 | 28.7 | 29.4 |
|  | Average value [%] of absorption loss amount at 850-1000 | 21.1 | 20.6 | 30.5 | 31.3 | 30.5 | 31.3 |

TABLE 8-continued

|  |  | Example 7 | Example 8 | Example 9 | Example 10 | Example 11 | Example 12 |
|---|---|---|---|---|---|---|---|
| Spectral characteristics of substrate | 440-600 nm, 0 deg average internal transmittance [%] | 81.2 | 85.9 | 90.0 | 84.9 | 89.4 | 84.3 |
|  | 700-800 nm, 0 deg average internal transmittance [%] | 0.0 | 0.1 | 1.1 | 0.1 | 1.1 | 0.1 |
|  | 800-1000 nm, 0 deg average internal transmittance [%] | 0.3 | 5.2 | 5.2 | 0.3 | 5.2 | 0.3 |

From the above results, for the optical filters in Example 1, Example 2, Example 4, and Examples 6 to 12, the absolute value of the difference between the average transmittance $T_{440\text{-}600(0deg)AVE}$ and the average transmittance $T_{440\text{-}600(0deg)AVE}$ is 15% or less, so the change in visible light transmittance is small even at a high incident angle of 60 degrees, and the average transmittance $T_{440\text{-}600(0deg)AVE}$ is 75% or more, maintaining a high visible light transmittance. The wavelength $IR\_T_{50(0deg)}$ at which a transmittance is 50% at an incident angle of 0 degrees is in the range of 580 nm to 640 nm, and light in a near-infrared light region is shielded to efficiently take in visible transmitted light. Further, the average transmittance $T_{700\text{-}800(0deg)AVE}$ is 1.1% or less and the average transmittance $T_{800\text{-}1200(0deg)AVE}$ is 5% or less, and the shielding property for near-infrared light is excellent in a wide range.

On the other hand, for the optical filter in Example 3, the average transmittance $T_{800\text{-}1200(0deg)AVE}$ exceeds 5%, and the shielding property for near-infrared light is low. This is due to the lack of absorption in the glass substrate.

In the optical filter in Example 5, the absolute value of the difference between the average transmittance $T_{440\text{-}600(0deg)AVE}$ and the average transmittance $T_{440\text{-}600(60deg)AVE}$ exceeds 15%, and the change in visible light transmittance is large at a high incident angle. This is because the reflectance of the dielectric multilayer film 1 in the near-infrared region is too high.

Although the present invention has been described in detail with reference to specific embodiments, it is apparent to those skilled in the art that various changes and modifications can be made without departing from the spirit and scope of the present invention. The present application is based on a Japanese Patent Application (Japanese Patent Application No. 2022-210260) filed on Dec. 27, 2022, the content of which is incorporated herein by reference.

INDUSTRIAL APPLICABILITY

The optical filter of the present embodiment has excellent weather resistance, a small change in spectral characteristics even at a high incident angle, has excellent transmissivity in the visible light region, and excellent shielding properties in the near-infrared light region, particularly in a wide range including 1200 nm. The optical filter is useful for applications of imaging devices such as cameras and sensors for transport machines, for which high performance has been achieved in recent years.

REFERENCE SIGNS LIST 1B optical filter
10 near-infrared ray absorbing glass
21, 22 dielectric multilayer film
30 resin film
40 substrate

The invention claimed is:

1. An optical filter comprising:
a first dielectric multilayer film;
a substrate comprising a near-infrared ray absorbing glass and a resin film; and
a second dielectric multilayer film in this order,
wherein the resin film comprises a near-infrared ray absorbing dye and a resin,
the near-infrared ray absorbing glass is a fluorophosphate glass comprising P, Cu, and F, and
the optical filter satisfies all of the following spectral characteristics (i-1) to (i-3), (i-5) to (i-7), and (i-13):
(i-1) an absolute value of a difference between an average transmittance $T_{440\text{-}600(0deg)AVE}$ at a wavelength of 440 nm to 600 nm and an incident angle of 0 degrees and an average transmittance $T_{440\text{-}600(60deg)AVE}$ at a wavelength of 440 nm to 600 nm and an incident angle of 60 degrees is 15% or less,
(i-2) the average transmittance $T_{440\text{-}600(0deg)AVE}$ is 75% or more,
(i-3) a wavelength $IR\_T_{50(0deg)}$ at which a transmittance is 50% at an incident angle of 0 degrees is in a wavelength range of 580 nm to 640 nm,
(i-5) an average transmittance $T_{800\text{-}1200(0deg)AVE}$ at a wavelength of 800 nm to 1200 nm and an incident angle of 0 degrees is 5% or less,
(i-6) when the first dielectric multilayer film side is set as an incident direction, an average reflectance $R1_{440\text{-}650(5deg)AVE}$ at a wavelength of 440 nm to 650 nm and an incident angle of 5 degrees is 1.5% or less,
(i-7) when the first dielectric multilayer film side is set as an incident direction, an average reflectance $R1_{850\text{-}1200(5deg)AVE}$ at a wavelength of 850 nm to 1200 nm and an incident angle of 5 degrees is 60% or more,
(i-13) when the first dielectric multilayer film side is set as an incident direction, an absolute value of a difference between a wavelength $IR\_R_{50(0deg)}$ at which a reflectance is 50% at an incident angle of 5 degrees in a wavelength range of 750 nm to 900 nm and a wavelength $IR\_T_{50(5deg)}$ at which a transmittance is 50% at an incident angle of 5 degrees in a wavelength range of 580 nm to 640 nm is 160 nm or more.

2. The optical filter according to claim 1, wherein the optical filter satisfies the following spectral characteristic (i-4):
(i-4) an average transmittance $T_{700\text{-}800(0deg)AVE}$ at a wavelength of 700 nm to 800 nm and an incident angle of 0 degrees is 1.1% or less.

3. The optical filter according to claim 1, wherein the optical filter satisfies the following spectral characteristic (i-8):
(i-8) when a dielectric multilayer film 1 side is set as an incident direction, an average reflectance $R1_{440\text{-}650(60deg)AVE}$ at a wavelength of 440 nm to 650 nm and an incident angle of 60 degrees is 10% or less.

4. The optical filter according to claim 1, wherein the optical filter satisfies all of the following spectral characteristics (i-9) and (i-10):
   (i-9) when the second dielectric multilayer film side is set as an incident direction, an average reflectance $R2_{440-650(5deg)AVE}$ at a wavelength of 440 nm to 650 nm and an incident angle of 5 degrees is less than 2.0%,
   (i-10) when the second dielectric multilayer film side is set as an incident direction, an average reflectance $R2_{700-850(5deg)AVE}$ at a wavelength of 700 nm to 850 nm and an incident angle of 5 degrees is 1.2% or less.

5. The optical filter according to claim 1, wherein the optical filter satisfies all of the following spectral characteristics (i-11) and (i-12):
   (i-11) when the second dielectric multilayer film side is set as an incident direction, an average reflectance $R2_{440-650(60deg)AVE}$ at a wavelength of 440 nm to 650 nm and an incident angle of 60 degrees is less than 10%,
   (i-12) when the second dielectric multilayer film side is set as an incident direction, an average reflectance $R2_{700-850(60deg)AVE}$ at a wavelength of 700 nm to 850 nm and an incident angle of 60 degrees is 8% or less.

6. The optical filter according to claim 1, wherein the optical filter satisfies all of the following spectral characteristics (i-14) and (i-15):
   (i-14) an average value of absorption loss amount$_{700-800}$ at a wavelength of 700 nm to 800 nm is 25% or more,
   (i-15) an average value of absorption loss amount$_{850-1000}$ at a wavelength of 850 nm to 1000 nm is 17% or more,
   wherein when the first dielectric multilayer film side is set as an incident direction, an absorption loss amount$_{X-Y}$ at a wavelength of X nm to Y nm is defined as follows:

(Absorption loss amount$_{X-Y}$) [%]=100−(transmittance at incident angle of 5 degrees)−(reflectance at incident angle of 5 degrees).

7. The optical filter according to claim 1,
   wherein the near-infrared ray absorbing glass has a thickness of 0.4 nm or less, and the near-infrared ray absorbing glass satisfies all of the following spectral characteristics (ii-1) to (ii-3):
   (ii-1) a wavelength IR_$T_{50(0deg)}$ at which a transmittance is 50% at an incident angle of 0 degrees is in a wavelength range of 590 nm to 640 nm,
   (ii-2) a transmittance $T_{700(0deg)}$ at a wavelength of 700 nm and an incident angle of 0 degrees is 25% or less,
   (ii-3) an average transmittance $T_{700-800(0deg)AVE}$ at a wavelength of 700 nm to 800 nm and an incident angle of 0 degrees is 10% or less.

8. The optical filter according to claim 1, wherein the substrate satisfies all of the following spectral characteristics (iii-1) to (ii-3):
   (iii-1) an average internal transmittance $T_{(in)440-600(0deg)AVE}$ at a wavelength of 440 nm to 600 nm and an incident angle of 0 degrees is 75% or more,
   (iii-2) an average internal transmittance $T_{(in)700-800(0deg)AVE}$ at a wavelength of 700 nm to 800 nm and an incident angle of 0 degrees is 1.2% or less,
   (iii-3) an average internal transmittance $T_{(in)800-1000(0deg)AVE}$ at a wavelength of 800 nm to 1000 nm and an incident angle of 0 degrees is 5% or less.

9. The optical filter according to claim 1, wherein the near-infrared ray absorbing dye comprises a squarylium dye having a maximum absorption wavelength at 740 nm to 800 nm in the resin.

10. The optical filter according to claim 1, wherein the resin film satisfies all of the following spectral characteristics (iv-1) to (iv-4):
    (iv-1) an average internal transmittance $T_{(in)(440-600(0deg)AVE}$ at a wavelength of 440 nm to 600 nm and an incident angle of 0 degrees is 90% or more,
    (iv-2) a wavelength IR_$T_{(in)50(0deg)}$ at which an internal transmittance is 50% at an incident angle of 0 degrees is in a wavelength range of 630 am to 645 nm,
    (iv-3) an absolute value of a difference between a wavelength IR_$T_{(in)70(0deg)}$ at which an internal transmittance is 70% at an incident angle of 0 degrees and a wavelength IR_$T_{(in)20(0deg)}$ at which an internal transmittance is 20% at an incident angle of 0 degrees, in a wavelength of 500 nm to 700 nm, is 60 nm or less,
    (iv-4) an average internal transmittance $T_{(in)700-200(0deg)AVE}$ at a wavelength of 700 nm to 800 nm and an incident angle of 0 degrees is 5% or less.

11. The optical filter according to claim 1,
    wherein the near-infrared ray absorbing glass comprises, in terms of mass %,
    $P^{5+}$: 30% to 70%,
    $Al^{3+}$: 0% to 20%,
    $Li^+$: 0% to 20%,
    $Na^+$: 0% to 25%,
    $K^+$: 0% to 25%,
    $Mg^{2+}$: 0% to 10%,
    $Ca^{2+}$: 0% to 20%,
    $Sr^{2+}$: 0% to 30%,
    $Ba^{2+}$: 0% to 40%,
    $\Sigma R^+$: 0.1% to 30% ($R^+$ is one or more components selected from $Li^+$, $Na^+$, and $K^+$),
    $\Sigma R^{2+}$: 10% to 45% ($R^{2+}$ is one or more components selected from $Mg^{2+}$, $Ca^{2+}$, $Sr^{2+}$, and $Ba^{2+}$), and
    $Cu^{2+}$: 1% to 20%, and
    is a fluorophosphate glass comprising 5 mass % to 70 mass % by external ratio of $F^-$ when component elements other than $F^-$ contained in the glass are taken as 100 mass %.

12. An imaging device comprising the optical filter according to claim 1.

* * * * *